United States Patent [19]

Chemla et al.

[11] Patent Number: 4,597,638
[45] Date of Patent: Jul. 1, 1986

[54] NONLINEAR OPTICAL APPARATUS

[75] Inventors: Daniel S. Chemla, Rumson; David A. B. Miller, Lincroft; Peter W. Smith, Colts Neck, all of N.J.

[73] Assignee: AT&T Bell Laboratories, Murray Hill, N.J.

[21] Appl. No.: 566,968

[22] Filed: Dec. 30, 1983

Related U.S. Application Data

[63] Continuation-in-part of Ser. No. 470,722, Feb. 28, 1983, abandoned.

[51] Int. Cl.$^4$ ............................................. G02F 1/015
[52] U.S. Cl. .................................................... 350/354
[58] Field of Search ................ 350/353, 354, 356, 386, 350/393, 394

[56] References Cited

U.S. PATENT DOCUMENTS

| | | | |
|---|---|---|---|
| 3,953,810 | 4/1976 | Veilex | 332/7.51 |
| 4,093,344 | 6/1978 | Damen et al. | 350/147 |

OTHER PUBLICATIONS

A. E. Kaplan, "Conditions of Excitation of New Waves (LITW) at Nonlinear Interface and Diagram of Wave States of the System", *IEEE J. of Quantum Electronics*, vol. QE-17, Mar. 1981, pp. 336-339.
Smith et al., "Experimental Studies of a Nonlinear Interface", *IEEE J. of Quantum Electronics*, vol. QE-17, No. 3, Mar. 1981, pp. 340-348.
Schnapper et al., "Remotely Controlled Integrated Directional Coupler Switch", *IEEE J. of Quantum Electronics*, vol. QE-17, No. 3, Mar. 1981, pp. 332-335.
A. E. Kaplan, "Theory of Hysteresis Reflection and Refraction of Light by a Boundary of a Nonlinear Medium", *Sov. Phys. JETP*, 45(5), May 1977, pp. 896-905.

*Primary Examiner*—Bruce Y. Arnold
*Attorney, Agent, or Firm*—Walter G. Nilsen

[57] ABSTRACT

A nonlinear optical apparatus is provided with a multiple layer heterostructure made from alternate layers of a charge carrier semiconductor material having a narrow bandgap energy, and a charge barrier material having a wider bandgap energy than the charge carrier material. The layers are deposited one upon the other in substantially flat planes forming a series of potential barriers. The potential barriers are capable of confining charge carriers which arise within the layers of the charge carrier semiconductor material to remain substantially therein. The optical absorption coefficient of the multiple layer heterostructure exhibits at least one sharp resonant optical absorption peak near the semiconductor material bandgap absorption. A light source is restricted to provide a beam of light photons of energy near the energy of the sharp resonant optical absorption peak for promoting production of charge carriers within the charge carrier semiconductor material. The light photons are directed into the multiple layer heterostructure so that the light photons may saturate the optical absorption coefficient and thereby cause the index of refraction of the multiple layer heterostructure to vary with incident light intensity.

20 Claims, 41 Drawing Figures

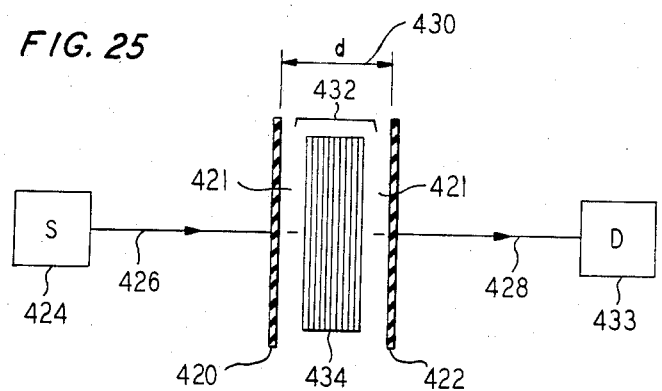
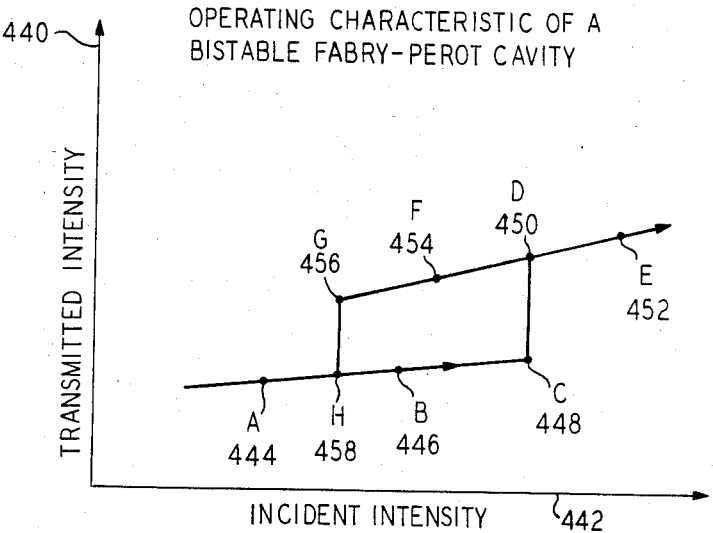
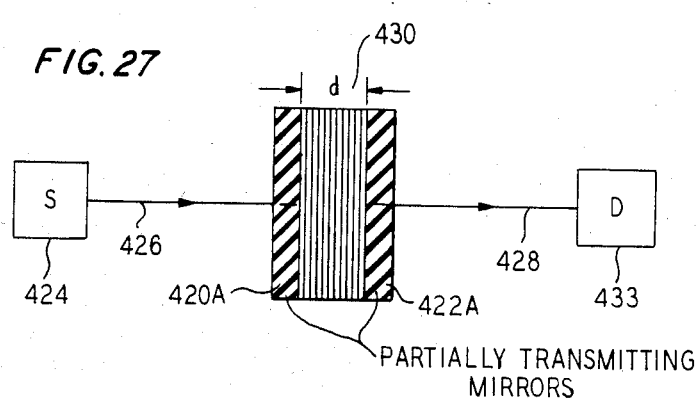

POLARIZATION SWITCH

NONLINEAR INTERFACE

WAVE GUIDE COUPLER

NONLINEAR OPTICAL APPARATUS

CROSS-REFERENCE TO RELATED APPLICATION

This application is a continuation-in-part of my copending application, Ser. No. 470,722, filed Feb. 28, 1983 now abandoned.

BACKGROUND OF THE INVENTION

1. Field of the Invention

This invention relates to nonlinear optical devices, and more particularly to nonlinear optical devices incorporating nonlinear optical materials formed from alternate layers of charge carrier and charge barrier materials which form multiple quantum well (MQW) structures, and incorporating low diode lasers as a light source.

2. Description of the Prior Art

Heretofore at room temperature nonlinear optical materials have required more power than is available from a milliwatt range solid state laser in order to saturate their absorption and thereby cause their index of refraction to vary with incident light intensity.

Nonlinear effects of light intensity on the index of refraction may be represented by the expression $$n = n_L + n_2 I$$

where n is the index of refraction of the material, $n_L$ is the low intensity index of refraction, I is the intensity of the incident light beam in, for example, units of Watts/cm$^2$, and $n_2$, is the coefficient of nonlinearity of the material and may be expressed in the units cm$^2$/Watt.

Measurements of $n_2$ at a wavelength of 1.06 microns for a number of materials were reported by Moran et al. in the article "Interferometric Measurements of the Nonlinear Refractive Index Coefficient Relative to CS$_2$ in Laser System Related Materials", in the *IEEE Journal of Quantum Electronics, Vol. OE*-11, June 1975, p. 259, and showed that $n_2$ for the material CS$_2$ is from 10 to 100 times larger than for a variety of materials used in laser construction. Moran et al. give $n_2 = 3.10^{-14}$ cm$^2$/Watt for CS$_2$. A measurement of the third order nonlinear susceptibility of silicon at a wavelength of 1.06 microns was reported by Jain et al. in the article "Degenerate Four-Wave Mixing Near the Bandgap of Semiconductors" in *Applied Physics Letters*, Vol. 35, September 1979, p. 454, as $8.10^{-8}$ esu, and this value is equivalent to a value of $n_2 = 3.5 \times 10^{-10}$ cm$^2$/Watt. The above values of $n_2$ are too small to make the above materials useful in a nonlinear optical device in which a milliwatt diode laser is used as the light source.

An optical bistable Fabry-Perot cavity containing a saturable absorber is described by A. Szöke, in U.S. Pat. No. 3,813,605 issued to A. Szöke on May 28, 1974. Szöke suggests using a CO$_2$ laser at a wavelength of 10.6 microns with SF$_6$ gas as the saturable absorber, and also suggests using a CW He-Ne laser but does not suggest a saturable absorber for the He-Ne laser. Szöke further suggests using the Fabry-Perot cavity and nonlinear absorber to produce short time duration optical pulses, as an optical amplifier inverter, as an optical Schmidt trigger, and as an optical flip-flop. However, the devices taught by Szöke use absorption saturation and not nonlinear refractive index changes.

A bistable optical interface was described by P. W. Smith et al. in the article "Optical Bistability at a Nonlinear Interface" in *Applied Physics Letters*, Vol. 35, December 1979 at p. 846. There, a glass to CS$_2$ interface was employed, and an incident intensity of $7.5 \times 10^9$ Watt/cm$^2$ was required to destroy the total reflection. Again, this light intensity is too great to make the bistable interface usable with a milliwatt diode laser.

Gibbs et al. in the article "Optical Bistability in Semiconductors" in *Appl. Phys. Letters*, Vol. 35, September 1979, at p. 451, observed optical bistability in a device comprising a 4.1 micron-thick layer of GaAs sandwiched between two 0.21 micron layers of Ga$_{0.58}$Al$_{0.42}$As layers in a temperature range of 5° to 120° K. The exciton peak was at approximately 818 nanometers. Bistability occurred at incident optical intensity of approximately 1.0 to 1.5 milliwatts/square micron, but above 120° K. the bistability disappeared.

Gibbs et al. in the article "Room Temperature Excitonic Optical Bistability in a GaAs-GaAlAs Superlative Etalon" in *Appl. Phys. Letters*, Vol. 41, August 1982, at p. 221, observed optical bistability in a multiple quantum well device used in a bistable Fabry-Perot cavity, and these authors disclosed the above-mentioned bistable Fabry-Perot cavity using a MQW in the *Optical Sciences Center Oscillations*, published by the Optical Sciences Center of the University of Arizona, No. 229, on Mar. 26, 1982. The MQW device taught by Gibbs et al. comprised 61 periods; each period containing a 336 Angstrom GaAs layer and a 401 Angstrom layer of Ga$_{0.73}$Al$_{0.27}$As, at a temperature of 300° K. Dielectric coatings were deposited on both surfaces to increase reflectivity to nearly 90 percent between 820 to 890 nanometers. Bistability was observed at 300° K. at a wavelength of 881 nanometers and at an input light intensity between approximately 70 milliwatts and 100 milliwatts focused to a spot size of 5–10 micron diameter. Again, the light intensity used by Gibbs et al. exceeds the intensity which can be conveniently supplied by a milliwatt power diode laser.

SUMMARY OF THE INVENTION

The foregoing problem, the design of optical devices with intensity dependent index of refraction materials used in conjunction with the low light intensities supplied by available diode lasers, have been solved in accordance with the present invention. The present invention teaches the use of a multiple quantum well (MQW) structure in conjunction with a milliwatt power level diode laser light source for the design of optical devices which depend upon the nonlinear index of refraction of the MQW.

A nonlinear optical apparatus which provides optical signal processing such as amplification, bistable operation, phase shifting, phase matching, laser mode locking, switching, etc., is provided. The nonlinear element is a multiple layer heterostructure which is made from a charge carrier semiconductor material having a narrow bandgap energy and a charge barrier material having a wider bandgap energy than the charge carrier material. The two materials are alternately deposited one upon the other to form multiple alternating layers. Such a multiple layer heterostructure is called a multiple quantum well (MQW) because a charge carrier within a layer of narrow bandgap material is trapped in a quantum potential well, and there is provided a multiple number of such quantum potential wells. Although the use of just two materials as described above is usually most convenient, a more general description of the MQW is as follows: A multiple layer heterostructure having first and second material layers having first and second bandgaps, respectively, and a semiconductor layer having a third bandgap and being positioned between said material layers, the bottom of the conduction band of said semiconductor layer being below the bottom of the conduction bands of said material layers, and the top of the valence band of said semiconductor layer being above the tops of the valence bands of said material layers. The MQW has a sharp resonant peak in its optical absorption curve. A light source which illuminates the MQW is restricted to emit light photons of energy near the energy of the sharp resonant optical absorption peak. Other light sources emitting photons which may be at other energies may also illuminate the MQW. The production of charge carriers by absorption of the photons within the charge carrier semiconductor material is thereby promoted. Means are provided for directing the light photons emitted by the, at least one, light source into the multiple layer heterostructure whereby the light photons may saturate the optical absorption coefficient at low incident intensity, and thereby cause the index of refraction of the multiple layer heterostructure to vary with the incident light intensity. Also provided is means for varying an illumination intensity within the multiple layer heterostructure in order to vary an optical absorption and an index of refraction of the multiple layer heterostructure for light photons.

It is an aspect of the present invention to provide optical devices which depend upon the saturation of optical absorption of MQW structures at low light intensities at room temperature such as bistable switches, optical amplifiers, passive laser mode lockers, optical switches, waveguide coupler switches, and other low power optical signal processing devices.

It is a further aspect of the present invention to provide MQW structures for which the resonant optical absorption, believed to be due to exciton absorption, may be tuned to photon energies which are useful in optical fiber communication systems. Tuning may be accomplished, for example, by adjustment of alloy compositions in order to adjust the height of the bandgap of the MQW materials, and, for example, by adjustment of the thickness of the narrow bandgap material in the MQW in order to adjust the exciton binding energy.

A still further aspect of the invention is to provide saturation of absorption at an optical frequency near an exciton resonance by use of a second light source which provides photons which are absorbed by the MQW structure. The absorbed photons from the second light source produce charge carriers within the MQW structure and thereby saturate the exciton absorption. Also, the frequency of the second light source need not be near the exciton resonance.

It is a still further aspect of the present invention to provide nonlinear optical devices which will operate with the low intensity available from diode lasers.

It is a still further aspect of the present invention to provide integrated optical devices in which signal processing MQW structures and also diode lasers may be grown on the same substrate.

Other and further aspects of the present invention will become apparent during the course of the following description and by reference to the accompanying drawings.

BRIEF DESCRIPTION OF THE DRAWING

FIG. 25 is a side view of a bistable Fabry-Perot cavity showing mirrors parallel to the MQW layer planes;

FIG. 26 is an operating curve of a bistable Fabry-Perot cavity;

FIG. 27 is a side view of a bistable Fabry-Perot cavity showing mirrors made by forming and treating the exterior surfaces of a MQW;

DESCRIPTION OF THE PREFERRED EMBODIMENT

EXAMPLE 1

Figure 1:
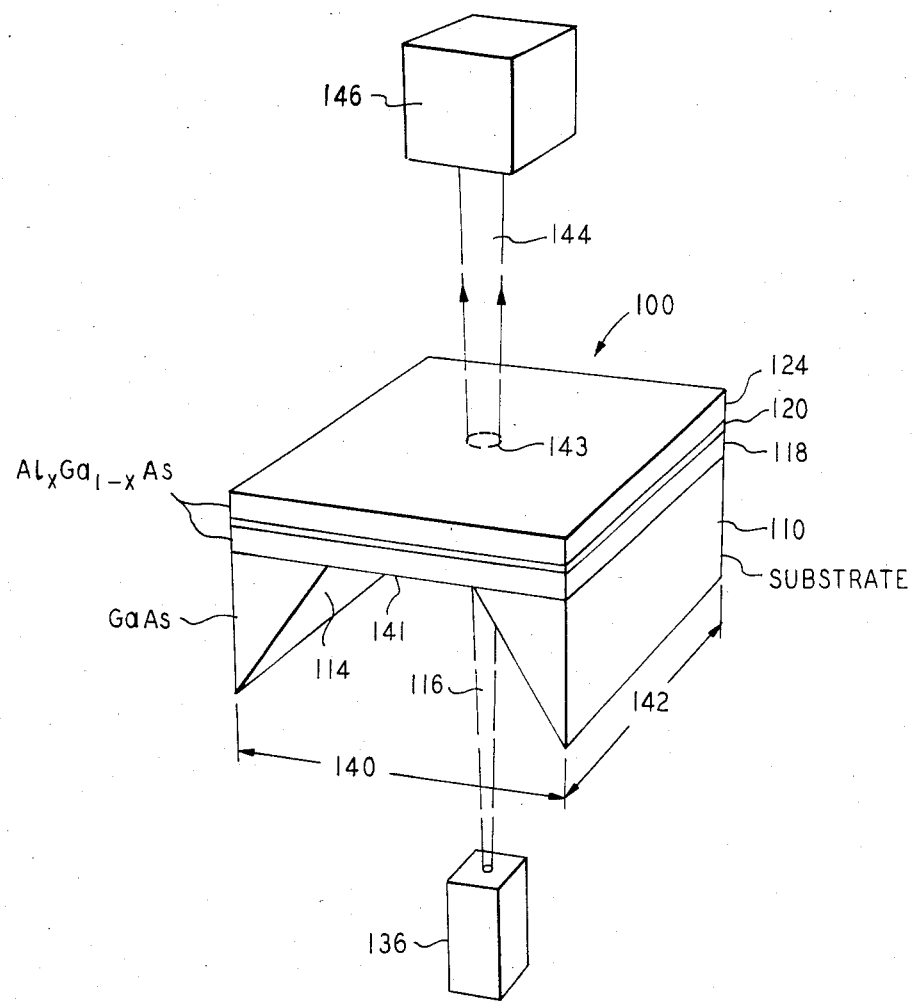
FIG. 1 is a perspective drawing showing a multiple quantum well structure mounted on a substrate.

Referring to FIG. 1, there is shown a GaAs-$Al_xGa_{1-x}As$ MQW device 100. The MQW device is made of a substrate 110 upon which is mounted a MQW structure 120. The substrate 110 is made of GaAs. A lower cap layer 118 of $Al_xGa_{1-x}As$ is epitaxially grown upon the substrate 110. The MQW structure 120 is epitaxially grown to the upper surface of the layer of $Al_xGa_{1-x}As$ 118. An upper cap layer 124 of $Al_xGa_{1-x}As$ is epitaxially grown to overlay the MQW structure 120. A section 114 of substrate 110 is removed in order to expose lower cap layer 118 and provide access to MQW structure 120 by incident light beam 116. Alternately, substrate 110 may be removed entirely and MQW structure 120 mounted upon a transparent support. MQW structures may be made either with or without cap layers 118 and 124.

Figure 2:
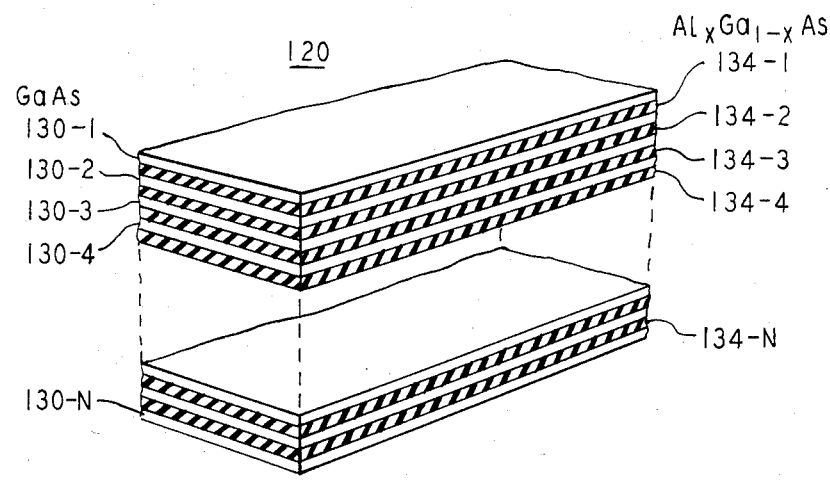
FIG. 2 is a perspective drawing showing details of a multiple quantum well structure of FIG. 1.

The MQW structure 120 is shown in FIG. 2 in an expanded view. Layers of GaAs 130-1 to 130-N are alternated with layers of $Al_xGa_{1-x}As$ 134-1 to 134-N. Convenient choices for the dimensions of the structures in the MQW are, for the thicknesses of the GaAs 130-1 to 130-N layers 0.01 micron, for the thickness of the $Al_xGa_{1-x}As$ 134-1 to 134-N layers 0.01 micron, and for the thickness of the GaAs substrate 110 approximately 100 microns. The thickness of the $Al_xGa_{1-x}As$ layer 118 may conveniently be chosen as approximately 1 micron, and also the thickness of the $Al_xGa_{1-x}As$ layer 124 may be chosen as approximately 1 micron. The side dimensions of the substrate 110 may be chosen conveniently as dimension 140 approximately 1 to 5 millimeters and dimension 142 as approximately 1 to 5 millimeters. The MQW structure 120 then has layer planes of GaAs 130-1 to 130-N whose length and width are approximately 1 to 5 millimeters and whose thickness is approximately 0.01 microns. Also the alternate layers of $Al_xGa_{1-x}As$ 134-1 through 134-N have the same ratio of length and width to thickness, that is, 1 to 5 millimeters in length and width and approximately 0.01 microns in thickness. Thus, the MQW structure comprises essentially plane layers of GaAs 130-1 to 130-N interleaved with plane layers of $Al_xGa_{1-x}As$ 134-1 to 134-N. The alternate layers of GaAs 130-1 to 130-N and $Al_xGa_{1-x}As$ 134-1 to 134-N may be deposited using, for example, molecular beam epitaxy using methods as, for example, taught by Dingle et al. in U.S. Pat. Nos. 3,982,207, 4,205,329, and 4,261,771. Epitaxial growth of heterostructures is further described in the reference book by Casey and Panish, "Heterostructure Lasers Part B: Materials and Operating Characteristics", at Chap. 6, pp. 71-155, and molecular beam epitaxy is particularly discussed at pp. 132-144, Academic Press, New York, 1978.

A light beam 116 is focused upon a first surface 141 of layer 118. The beam is focused to a spot 143, shown on the upper side of the layer 124 as spot 143. The light beam is produced by light source 136. Light source 136 may conveniently be chosen as, for example, a laser whose wavelength is tunable. Light emerges from the MQW structure as exit beam 144. Exit beam 144 strikes detector 146. Detector 146 measures the intensity of light beam 144 which exited from the MQW device 100. The position of light source 136 and detector 146 may be interchanged. The frequency of the photons emitted by light source 136 may be varied. By measuring the intensity of the transmitted light using detector 146, it is possible to measure the optical transmission of the MQW device 100, the primary contribution to which is the optical transmission of MQW structure 120.

Figure 3:
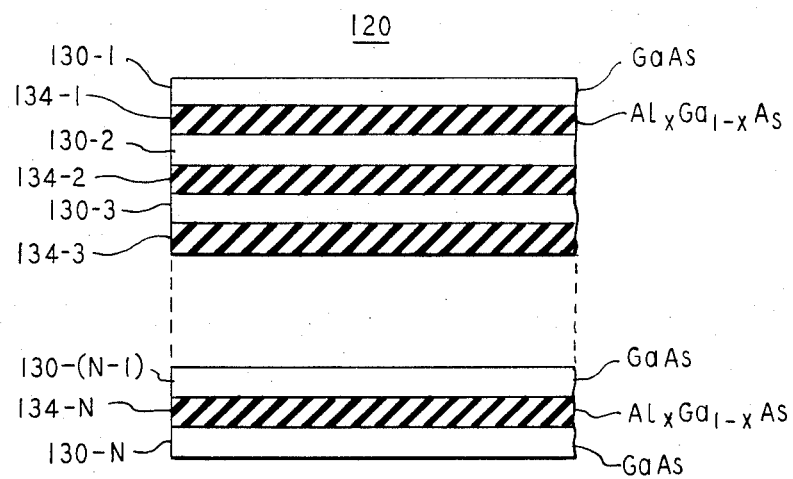
FIG. 3 is an end view of the multiple quantum well structure of FIG. 2.

Referring to FIG. 3, an end view of the MQW structure 120 of FIG. 2 is shown. The $Al_xGa_{1-x}As$ layers 134-1 to 134-N are shown interleaved with alternate layers of GaAs 130-1 to 130-N.

Figure 4:
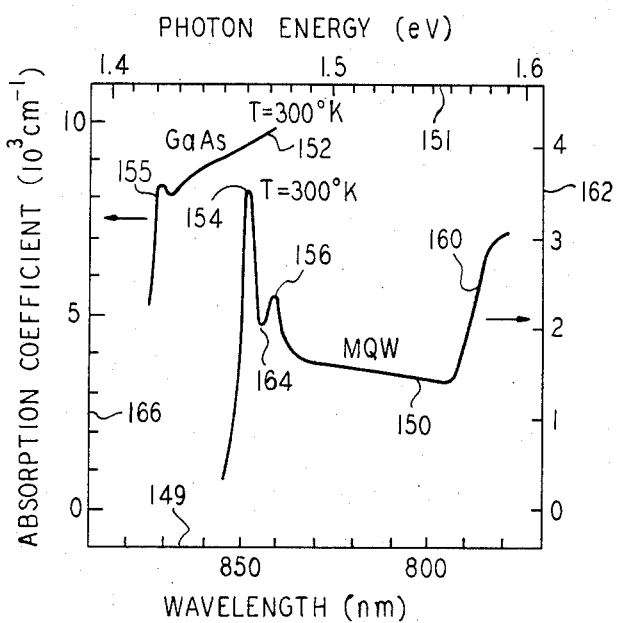
FIG. 4 is a graph of the optical transmission of a multiple quantum well structure and also bulk GaAs.

Referring to FIG. 4, a typical graph of the optical transmission of MQW device 100 is shown plotted versus both the photon wavelength along the bottom scale 149 and the photon energy along the top scale 151. The MQW absorption curve 150 shows peaks 154 and 156 indicating resonant absorption at a wavelength of approximately 848 nanometers and at approximately 842 nanometers. The data shown in curve 150 was taken using experimental apparatus at a temperature of 300° Kelvin. In comparison, optical absorption curve 152 for bulk GaAs is shown also taken at 300° Kelvin. Referring to the optical absorption of the MQW curve 150, the absorption peak 154 at 848 nanometers and the absorption peak 156 at approximately 842 nanometers are thought to arise from exciton structures within the MQW. Band-to-band transitions with some excitonic enhancement are thought to account for the remainder of the optical absorption curve 150. The scale 162 on the righthand side of FIG. 4 gives the optical absorption coefficient for the MQW structure curve 150. The curve shows an optical absorption approaching zero at wavelengths longer than 850 nanometers, with a sharp rise to an absorption peak 154 of approximately $3.5 \times 10^3$ cm$^{-1}$, and a rapid fall in optical absorption at approximately 845 nanometers to a minimum 164 and a small rise in absorption at 842 nanometers at peak 156.

The optical absorption then remains approximately constant as the energy of the photons in the light beam increases until the next absorption rise 160. The difference between the optical absorption of the bulk GaAs and the MQW structure 120 is thought to arise from trapping of charge carriers within the GaAs layers of the MQW. The bulk GaAs exciton absorption depends upon exciton levels whose energy is too close to the bandgap to resolve the individual peaks at 300° K. The excitons of the MQW structure 120 are thought to have greater binding energy because of interactions arising from the thinness of the GaAs layers.

Figure 5:
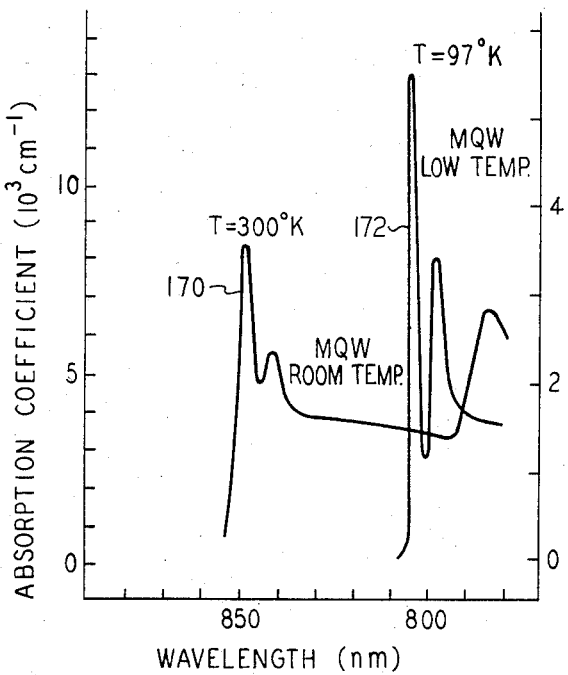
FIG. 5 is a graph of the optical transmission of a multiple quantum well structure at different temperatures.
Figure 7:
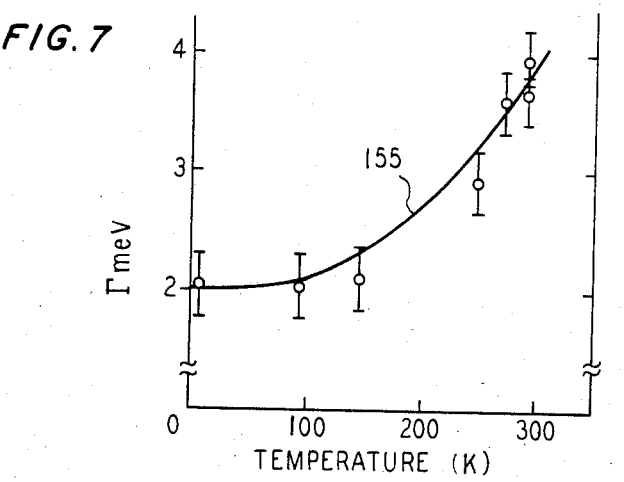
FIG. 7 shows the halfwidth at half maximum for the low energy exciton resonant peak plotted versus temperature.

Referring to FIG. 5, curve 170 gives the optical absorption of the MQW device 100 at a temperature of 300° Kelvin. Further, curve 172 gives the optical absorption of a similar device 100 at a temperature of approximately 97° Kelvin. The energy of the exciton absorption peak in curve 170 is seen to differ from the low temperature absorption peak in curve 172 in that the absorption peak 172 is shifted to shorter wavelengths, and both excitonic peaks in curve 172 are sharper and more pronounced than at 300° Kelvin. Referring to FIG. 7, the halfwidth of the lower energy exciton peak 154 in FIG. 4 is shown at half maximum of the peak, and is shown in curve 155 plotted versus the temperature at which the data was taken. Curve 155 in FIG. 7 shows that the exciton absorption is sharper at temperatures below room temperature of approximately 300° K., but that the resonance is not too broad to be lost in the interband transitions at temperatures of 300° K.

Figure 6:
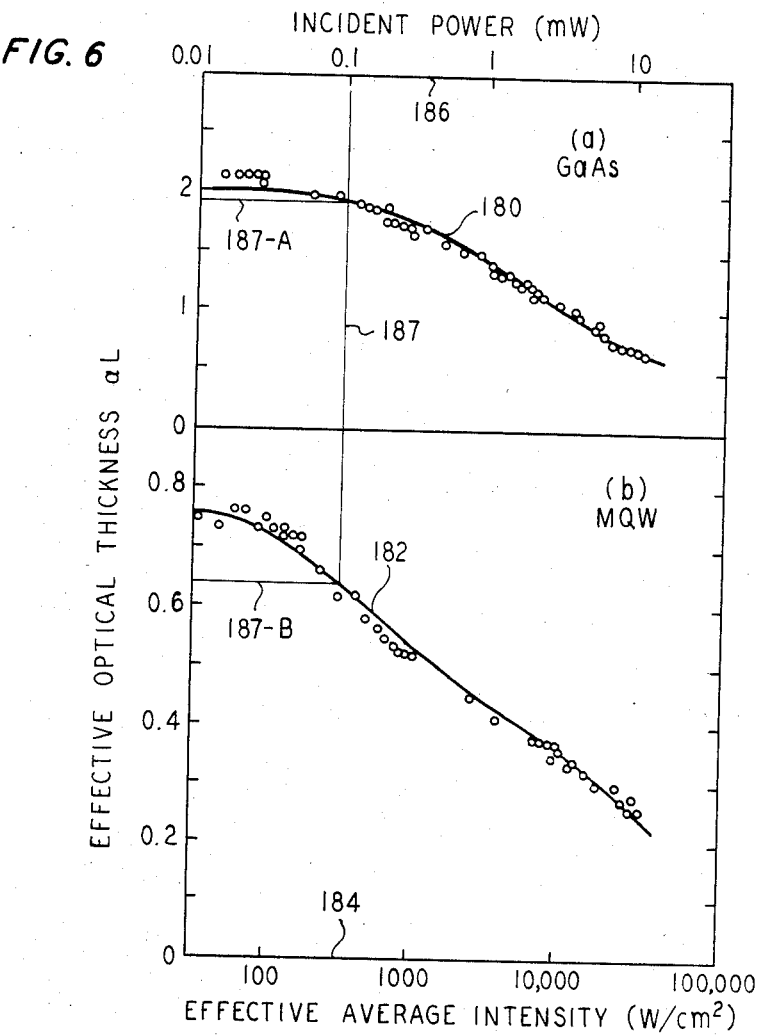
FIG. 6 is a graph showing optical absorption versus the intensity of an incident light beam for both a multiple quantum well structure and bulk GaAs.

Referring to FIG. 6, the effective optical thickness of the MQW structure mounted on substrate 100 is shown plotted versus the intensity of incident light beam 116. For curve 182, the incident light beam 116 is adjusted to coincide with peak 154 in the optical absorption curve 150 in the MQW structure 120 mounted on a substrate 110. For curve 180, the incident light beam 116 is adjusted to coincide with peak 155 in the optical absorption curve 152 in a similarly mounted bulk GaAs sample. The intensity of light beam 116 was varied by varying source 136. The effective optical thickness of the sample measures the total attenuation of the light beam as it traverses the sample. Curve 180 shows the effective optical thickness of a bulk sample of GaAs. Curve 182 shows the effective optical thickness of the MQW device 100. The effective average intensity of light beam 116 is plotted along the lower margin 184 of FIG. 6 and is shown to vary from approximately 30 W/cm$^2$ to approximately 50,000 Watts/cm$^2$. The total incident power in beam 116 is plotted along the upper margin 186 of FIG. 6 and is shown to vary from 0.01 to approximately 50 milliwatts. A comparison of the effective optical thickness of bulk GaAs and MQW device 100 at an incident light power of 0.1 milliwatts is shown by lines 187, 187-A, 187-B. The effective optical thickness of the bulk GaAs shown in curve 180 is shown to decrease from a value of approximately 2 to a value of approximately 1.9 at an incident power of approximately 0.1 milliwatts, an approximate change in effective optical thickness of $(2.0-1.9)/2 = 5\%$. In contrast, the effective optical thickness of the MQW device 100 is seen to vary from approximately 0.75 to approximately 0.63 as the incident power varies from zero to 0.1 milliwatts, for a percentage change of approximately $(0.75-0.63)/0.75 = 16\%$. The decrease in effective optical thickness with increasing beam intensity is attributed to saturation of the optical absorption of the material, and is commonly referred to as a nonlinear absorption. The large saturation exhibited by the MQW structure 120 at low light intensity makes it feasible to design nonlinear optical devices using diode lasers as the light source.

Figure 8:
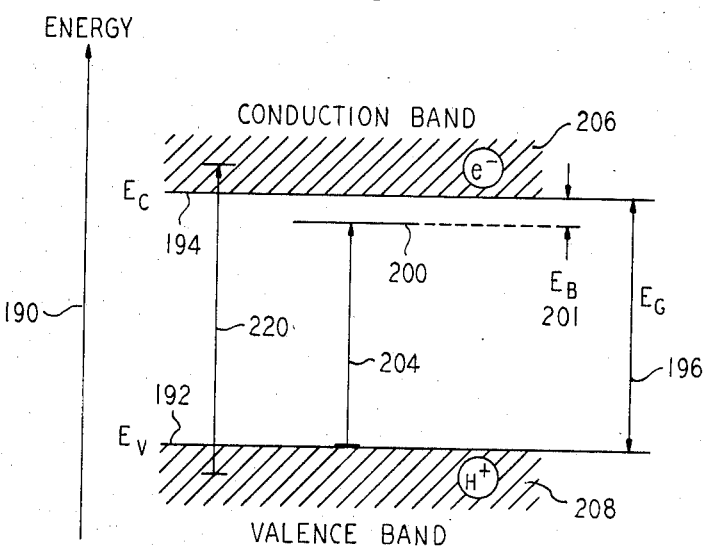
FIG. 8 shows the band structure of GaAs near the zero momentum point, and including an exciton level.

Referring to FIG. 8, the band structure of GaAs is shown in a simplified diagram. Reference to the GaAs band structure as shown in FIG. 8 provides insight into exciton absorption in MQW structure 120. Energy is plotted along the vertical axis 190. The valence band $E_v$ 192 and the conduction band $E_c$ 194 are shown along with the energy gap $E_G$ 196. An exciton level 200 is shown with a binding energy $E_B$ 201 measured from the conduction band 194.

A photon absorption transition 204 from the valence band 192 to the exciton level 200 is shown. Transition 204 represents an exciton creation transition, and such transitions are thought to be the cause of resonant absorption peaks 154 and 156 as shown in FIG. 4. After the exciton level 200 is formed as a result of photon absorption, the exciton may break apart and form both a conduction band electron 206 and a valence band hole 208. The exciton is thought to break apart as a result of ionization by a lattice vibration phonon which supplies the necessary energy.

An interband photon absorption transition 220 in which a conduction band electron 206 and a valence band hole 208 are formed as a result of photon absorption is shown. Interband photon transitions 220 are thought to account for the stepwise rise in optical absorption of MQW structure 120 as shown in FIG. 4. The interband photon absorption transition 220 is a direct transition because of the baNdRstructure of GaAs.

Figure 9:
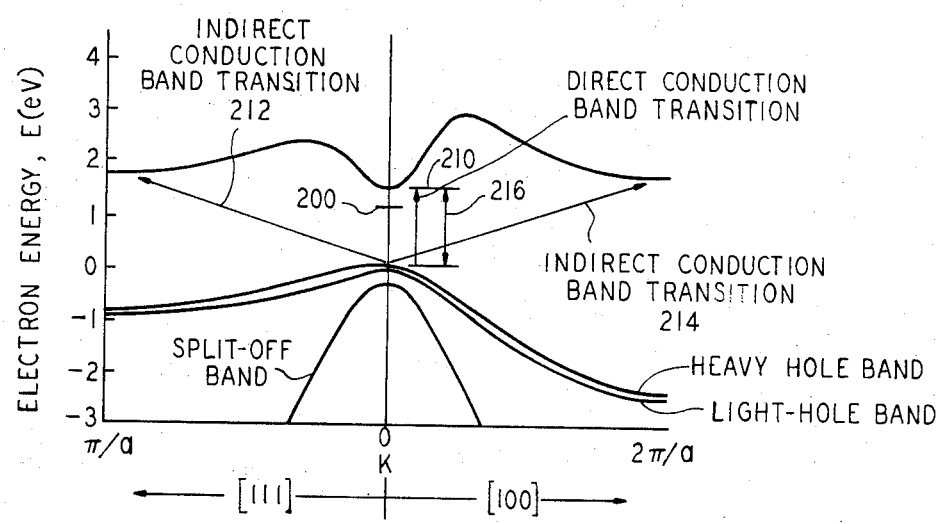
FIG. 9 shows the band structure of GaAs plotted as a function of momentum wave vector.

Referring to FIG. 9, the band structure of GaAs is shown with the energy plotted as a function of momentum wave vector along the [100] and [111] directions in momentum space. FIG. 9 is adapted from Casey and Panish in the book "Heterostructure Lasers, Part A: Fundamental Principles", at p. 189, Academic Press, New York, 1978. A direct optical absorption transition 210 is shown near the zero momentum point. Further, indirect optical absorption transitions 212 and 214 are shown. Both direct optical absorption processes in GaAs and $Al_xGa_{1-x}As$ and indirect absorption processes in AlGaAs are useful in the present invention. Both GaAs and $Al_xGa_{1-x}As$ may be used as a charge carrier material in different embodiments of the present invention, and a direct bandgap in the charge carrier material is useful in the practice of the present invention. The width of the direct bandgap 216 is shown, and bandgap 216 corresponds to bandgap 196 shown in the simplified diagram of FIG. 8. Exciton level 200 is shown below the conduction band and at the zero momentum point as shown in FIG. 8. Indirect absorption processes are useful in the wide bandgap charge barrier material to produce electrons and holes which move into the narrow bandgap charge carrier material, where the electrons and holes contribute to saturation of exciton absorption.

Figure 10:
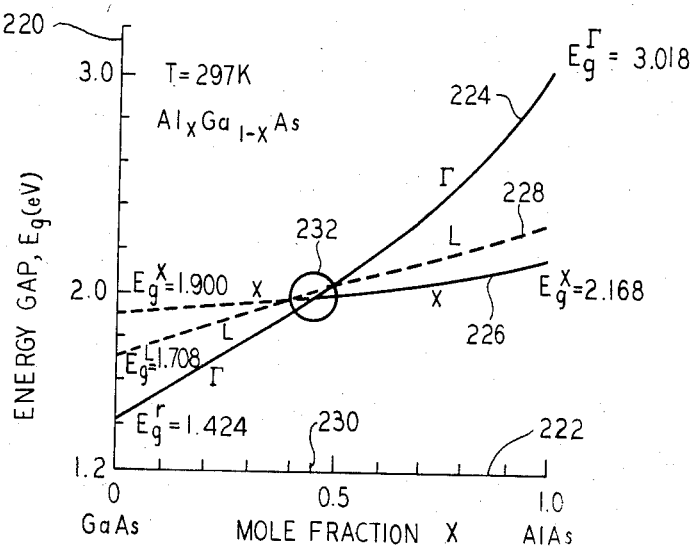
FIG. 10 is a graph of the width of the bandgap of $Al_xGa_{1-x}As$ as a function of mole fraction x.

Referring to FIG. 10, the width of the bandgap in the material $Al_xGa_{1-x}As$ is shown plotted as a function of the mole fraction x. The energy of the bandgap is plotted along the vertical axis 220. The mole fraction x is plotted along the horizontal axis 222. Curve 224 shows the direct bandgap at the zero momentum point. Curve 226 and curve 228 show two different indirect bandgaps. The lower bandgap becomes indirect at a mole fraction 230 of approximately x=0.42, where the zero momentum curve 224 crosses curve 226 at point 232. FIG. 10 is adapted from Casey and Panish in the book "Heterostructure Lasers Part A: Fundamental Principles", at p. 193, Academic Press, New York, 1978.

Figure 11:
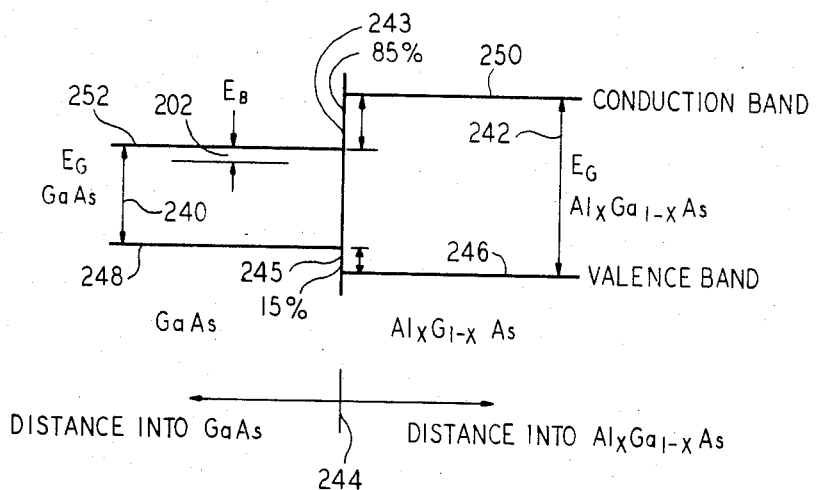
FIG. 11 shows in real space the band structure of GaAs compared with the band structure of $Al_xGa_{1-x}As$ at the zero momentum point.

Referring to FIG. 11, the bandgap 240 of GaAs and the bandgap 242 of $Al_xGa_{1-x}As$ are shown for an epitaxially grown junction 244. Such junctions occur between the layers of epitaxially grown alternate layers of GaAs and $Al_xGa_{1-x}As$ as shown in FIGS. 2 and 3. The valence band edge 246 of $Al_xGa_{1-x}As$ is believed to be lower in energy than the valence band edge 248 of GaAs. The conduction band edge 250 of $Al_xGa_{1-x}As$ is believed to be higher in energy than the conduction band edge 252 of GaAs. The total difference between the two gaps, of GaAs and $Al_xGa_{1-x}As$, is believed to be distributed as approximately 15 percent 245 of the difference appears as a lowered valence band edge 246 of $Al_xGa_{1-x}As$, and approximately 85 percent 243 of the difference appears as an increase in the conduction band edge 250 of $Al_xGa_{1-x}As$.

Figure 12:
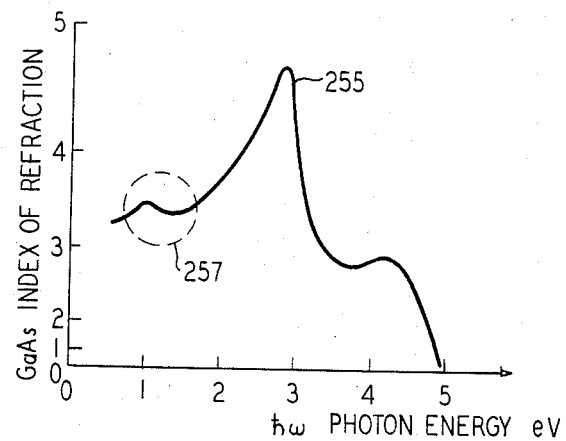
FIG. 12 shows the variation of the index of refraction with photon energy.

Referring to FIG. 12, the low intensity index of refraction of GaAs is shown schematically. FIG. 12 illustrates the index of refraction of GaAs for photon energy up to 5 eV. FIG. 12 is adapted from a plot of dielectric constant given by the reference "Semiconducting and Other Major Properties of Gallium Arsenide," J. S. Blakemore, published in the *Journal of Applied Physics*, Vol. 53, No. 10, October 1982 at pages R123, R150. The exciton range of the spectrum is indicated by circle 257.

Figure 13:
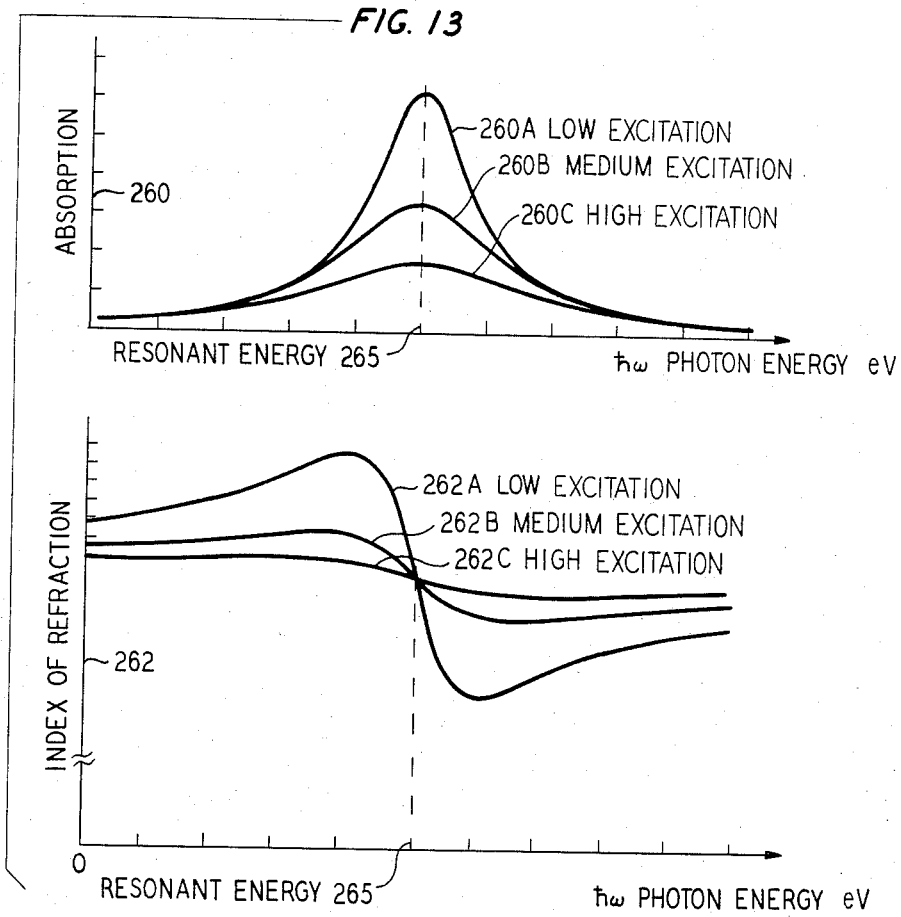
FIG. 13 shows the relation between optical absorption and index of refraction for a Lorentzian line given by the Kramers-Kronig relationship.

Referring to FIG. 13, an example of the variation of optical absorption 260 and index of refraction 262 with photon energy is shown as the two are related by the Kramers-Kronig relationship; a Lorentzian lineshape is used as an illustrative example. The curves of optical absorption 260 and index of refraction 262 illustrative generally the variation of these quantities for exciton absorption over the photon energy range shown by circle 257. The curves shown in FIG. 13 illustrate figuratively the relationship between optical absorption as shown in FIGS. 4 and 5 for MQW structure 120 and the corresponding index of refraction, as that relationship is given by the Kramers-Kronig relationship using a Lorentzian absorption lineshape.

Curve 260-A represents a large optical resonant absorption for a fixed low excitation resulting from low incident light intensity, and a corresponding index of refraction is shown in curve 262-A. A smaller resonant absorption is represented by curve 260-B for a higher fixed excitation resulting from high incident light intensity and the correspondingly smaller index of refraction is represented by curve 262-B. A further smaller resonant absorption is represented by curve 260-C for a still higher fixed excitation resulting from still higher incident light intensity and the correspondingly smaller index of refraction is represented by curve 262-C. Curves 260-A, 260-B and 260-C are drawn for different constant excitation of the medium in order to illustrate the variation of index of refraction with incident intensity. However, a MQW has a much more complex behavior and will differ from the illustration shown in curves 260-A, 260-B and 260-C.

The variation of the index of refraction of GaAs with incident light intensity is complicated. For a single exciton resonance the Kramers-Kronig model illustrated in FIG. 13 shows that for photon energy below the resonant energy 265 the index of refraction decreases with increasing light intensity, while for photon energies above the resonant energy 265 the index of refraction increases with increasing incident light intensity.

For a multiple quantum well, the variation of index of refraction with light intensity depends upon the interaction of at least one and possibly several exciton resonances with the processes leading to the background index of refraction. These interactions involve quantum interference effects which further complicate the detailed variation of the index of refraction with both light intensity and photon energy. For example, the GaAs-$Al_xGa_{1-x}As$ MQW, whose measured optical absorption coefficient is shown in FIGS. 4 and 5, is dominated by two resolvable exciton absorption peaks superimposed upon an interband transition background. The decomposition of the GaAs-$Al_xGa_{1-x}As$ MQW absorption spectrum into two exciton resonances and an interband continuum is further illustrated in FIG. 22, as is discussed further below.

Figure 14:
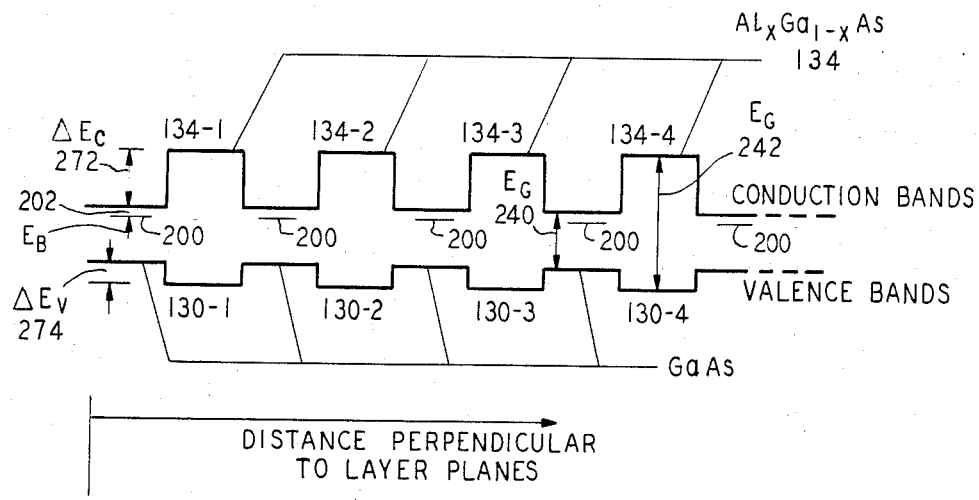
FIG. 14 shows in real space the band structure at the zero momentum point of a multiple quantum well made from GaAs and $Al_xGa_{1-x}As$.

Referring to FIG. 14, the potentials seen by both a conduction band electron and by a valence band hole within a MQW structure 120 are shown. Exciton levels 200 and binding energy $E_B$ 202 are shown. The conduction band electron energy barrier $\Delta E_C$ 272 is shown. The valence band hole energy barrier $\Delta E_V$ 274 is shown. A conduction electron produced in a GaAs layer 130 is trapped in a potential well with sides of height $\Delta E_C$ 272. The magnitude of $\Delta E_C$ 272 depends upon the mole fraction x of Al in the alternate $Al_xGa_{1-x}As$ layers 134. Correspondingly, valence band holes produced within a GaAs layer 130 are trapped by the energy barrier $\Delta E_V$ 274 between a GaAs layer 130 and a $Al_xGa_{1-x}As$ layer 134. Also the magnitude of the energy barrier $\Delta E_V$ 274 depends upon the mole fraction x of Al present within the $Al_xGa_{1-x}As$ layers 134. It is believed that the fraction $\Delta E_C/(\Delta E_C+\Delta E_V)=0.85$ and the fraction $\Delta E_V/(\Delta E_C+\Delta E_V)=0.15$ in an epitaxial junction between GaAs and $Al_xGa_{1-x}As$.

Figure 15:
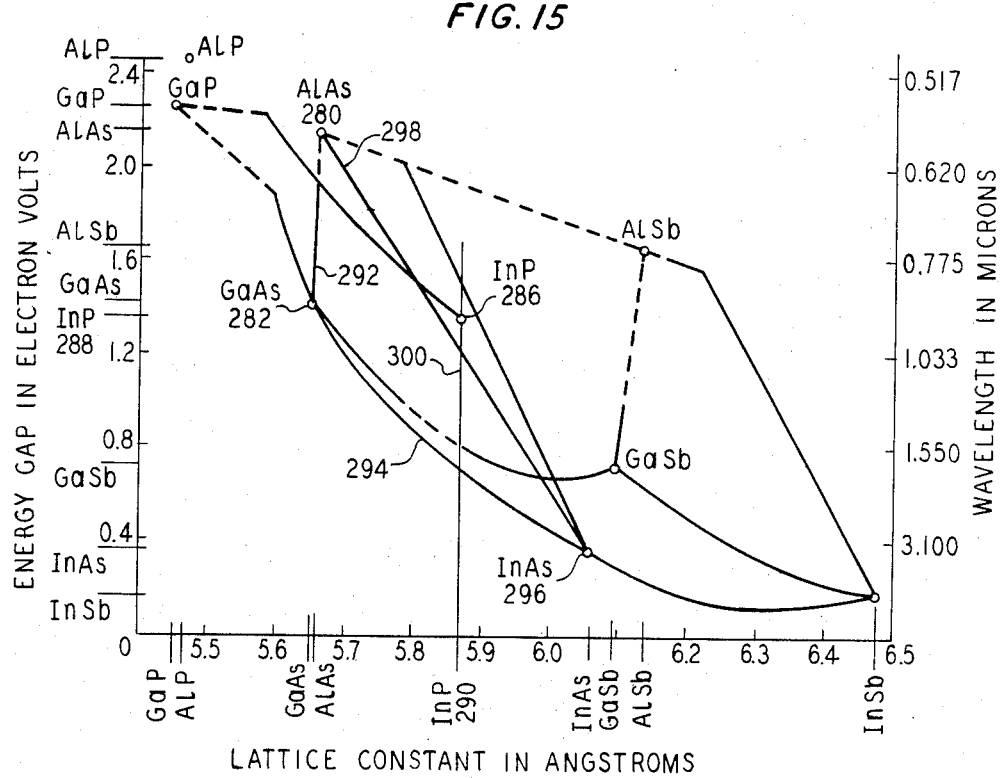
FIG. 15 is a graph showing lattice constant versus bandgap for a variety of alloy compositions.

Referring to FIG. 15, the curves depict the variation of both energy gap and lattice constant with variation of alloy composition for a number of useful binary and quaternary alloys. AlAs 280 is shown with a lattice constant of approximately 5.66 Angstroms and a bandgap of approximately 2.17 $E_V$. GaAs 282 is shown with a lattice constant of approximately 5.655 Angstroms and a bandgap of 1.42 $E_V$. The close match of the lattice constants of GaAs and AlAs permits epitaxial growth of the substances over a wide range of the mole fraction x of Al in $Al_xGa_{1-x}As$. Thus, layers of useful alloys of $Al_xGa_{1-x}As$ may be grown epitaxially upon layers of GaAs, and the bandgap of the alloy varied over the approximate range of 1.42 eV for pure GaAs to 1.95 for $Al_xGa_{1-x}As$ with x=0.42.

EXAMPLE 2

A MQW structure 120 may be made by using alternate layers of $Al_xGa_{1-x}As$ with different values of mole fraction x for the alternate layers, but x unequal to zero for the charge carrier layers. Values of mole fraction x should be smaller for the charge carrier layers and larger for the charge barrier layers in order that energy barriers at the layer junctions will trap the charge carriers within potential wells at the boundaries of the charge carrier and barrier layers. However, the most useful values of mole fraction x for charge carrier material lie within the range 0 through approximately 0.42 because for larger values of x, the valence to conduction band transitions become indirect, as referred to at FIG. 10. A GaAs crystal may be used as the substrate upon which alternate layers of $Al_xGa_{1-x}As$ are grown epitaxially because of the good lattice match. Although a MQW with alternate layers of two materials (GaAs and $Al_xGa_{1-x}As$) provides for a simple structure to fabricate, the general requirements for a MQW provides for a larger variety of structures. These general requirements for a MQW are as follows: A multiple layer heterostructure having first and second material layers having first and second bandgaps, respectively, and a semiconductor layer having a third bandgap and being positioned between said material layers, the bottom of the conduction band of said semiconductor layer being below the bottom of the conduction bands of said material layers, and the top of the valence band of said semiconductor layer being above the tops of the valence bands of said material layers.

EXAMPLE 3

The use of $In_{1-x-y}Ga_xAl_yAs$ as a material for MQW construction may be understood by reference to FIG. 15. InP is illustrated at point 286 as having a bandgap of approximately 1.35 eV 288 and a lattice constant of approximately 5.870 Angstroms 290. An alloy of a quaternary solution made from InAs and GaAs and AlAs may be represented by a point within the threesided figure with boundary 292 drawn from AlAs 280 to GaAs 282, and boundary 294 drawn between GaAs 282 and InAs 296, and boundary 298 drawn from InAs 296 to AlAs 280. Those alloys which are lattice matched to InP are represented along the vertical line 300 passing through the InP point 286. It has been found that lattice matching occurs for compositions in which mole fraction x and mole fraction y are related by $$x+y=0.47\pm0.01. \tag{1}$$

Figure 16:
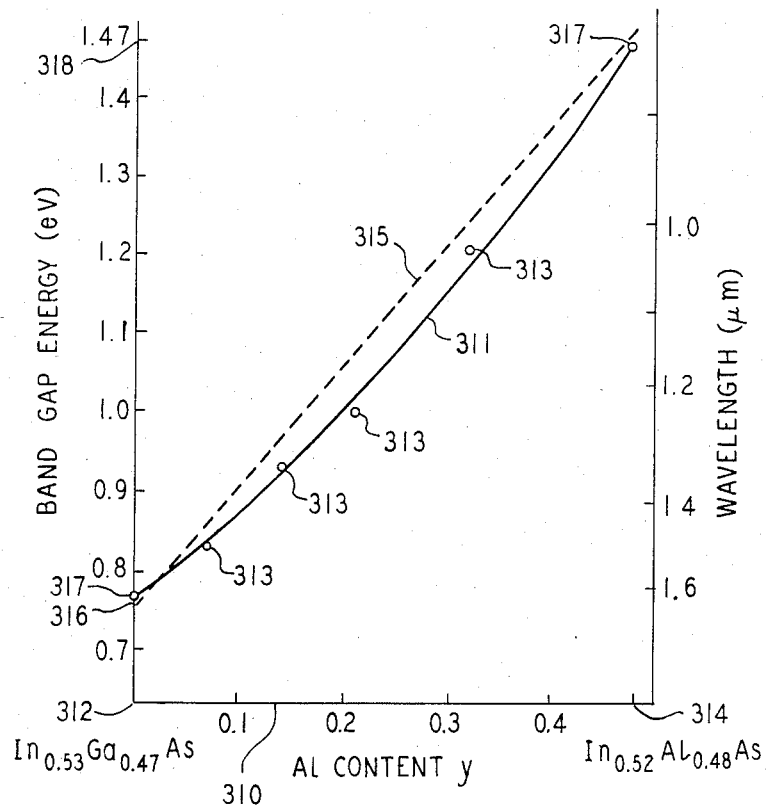
FIG. 16 is a graph of the bandgap energy of $In_{1-x-y}Ga_xAl_yAs$ versus Al content y.

The bandgap is expected to be adjustable between those of $In_{0.53}Ga_{0.47}As$ with a bandgap of 0.76 eV, 1.63 micron, and of $In_{0.52}Al_{0.48}As$ with a bandgap of 1.46 eV, 0.85 micron. This spectral range is useful for optical communication systems because it contains the region of lowest absorption loss and of lowest dispersion for optical fibers, as further shown in FIG. 17, which is explained hereafter. The variation of bandgap with al content y of $In_{1-x-y}Ga_xAl_yAs$ lattice matched to InP is shown in FIG. 16. The horizontal axis 310 represents a plot of y, the mole fraction of Al, and the left side 312 starts at y=0, which represents $In_{0.53}Ga_{0.47}As$. The value of y is plotted through the value 0.48 which represents $In_{0.52}Al_{0.48}As$ 314. The bandgap of the material is seen to vary from a value at y=0 of approximately 0.76 eV at point 316 through a value of approximately 1.47 at point 318. The measurements 313 shown in FIG. 16 are more fully discussed in the paper by Olego et al., "Compositional Dependence of Band Gap Energy and Conduction-Band Effective Mass of $In_{1-x-y}Ga_xAl_yAs$ Lattice Matched to InP", in *Applied Physics Letter,* Vol. 41, Sept. 1982, p. 476. Solid curve 311 is a fit to data points 313. Dotted curve 315 is a straight line approximation drawn between the endpoints 317 of the mole fraction y range.

Figure 17:
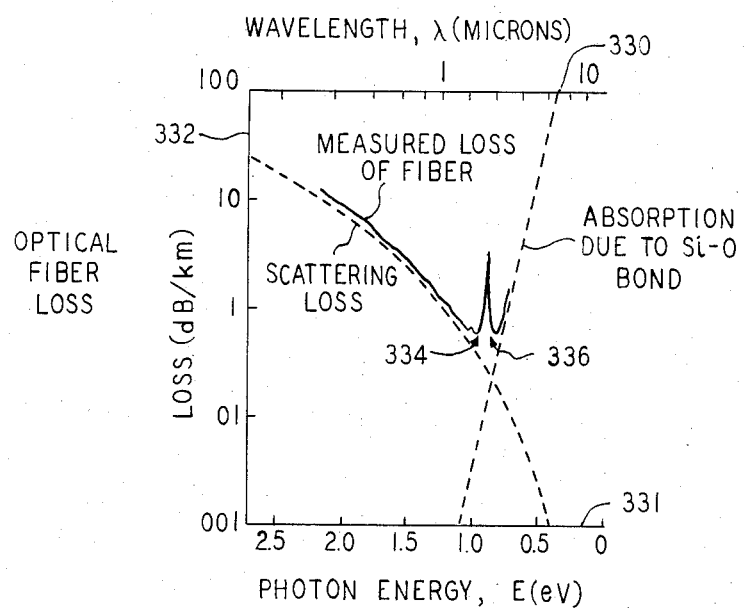
FIG. 17 is a graph of optical absorption versus photon energy for a typical optical fiber used in a lightwave communication system.
Figure 18:
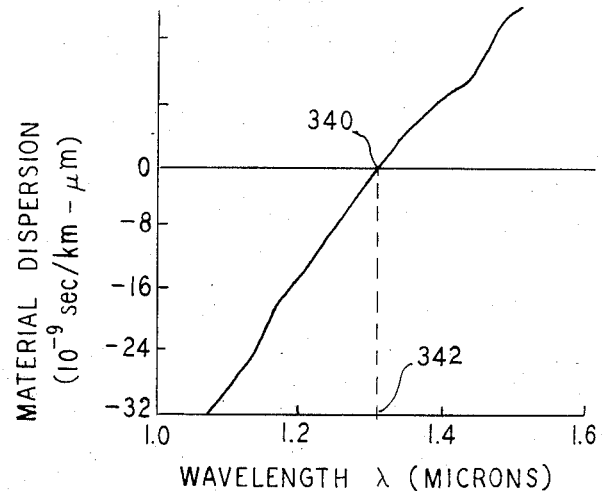
FIG. 18 is a graph of optical dispersion versus photon energy for a typical optical fiber used in a lightwave communication system.

Referring to FIGS. 17 and 18, the desirability of tuning the MQW structure 120 to wavelengths for which optical absorption is a minimum and optical dispersion is a minimum is explained. Referring to FIG. 17, there is illustrated the optical transmission loss of a typical $GeO_2$-$SiO_2$ core and $B_2O_3$-$SiO_2$ cladding optical fiber. The horizontal axis 330 gives a photon wavelenvth scale and axis 331 gives a photon energy scale. The vertical axis 332 gives the optical signal loss in decibels per kilometer of fiber. The absorption curve has a minimum 334 at approximately 1.2 micron and a second minimum 336 at approximately 1.6 micron. It is convenient to operate a lightwave communication system near a wavelength at which optical fiber has a minimum of loss due to optical absorption, such as at the first minimum 334 of 1.2 micron or the second minimum 336 of 1.6 micron.

Referring to FIG. 18, the material dispersion for the typical $GeO_2$-$SiO_2$ core and $B_2O_3$-$SiO_2$ cladding optical device is illustrated. The material dispersion is given in the units of $10^{-9}$ seconds per kilometer per micron. The material dispersion is proportional to the derivative of the index of refraction with respect to light wavelength. The dispersion is seen to pass through zero 340 at a wavelength of approximately 1.3 micron 342. It is convenient to operate an optical communications system at a wavelength at which the dispersion is near a minimum in order to prevent pulse spreading during transmission so that high data rates and short optical pulses may be utilized. FIGS. 17 and 18 are adapted from the reference book by Casey and Panish, "Heterostructure Lasers Part B: Materials and Operating Characteristics," at p. 2, Academic Press, New York, 1978.

Figure 19:
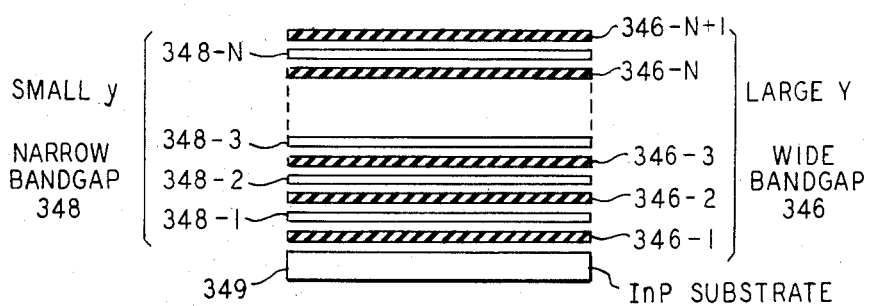
FIG. 19 is a diagram of a MQW structure using $In_{1-x-y}Ga_xAl_yAs$, with different bandgap compositions in alternate layers.

The use of $In_{1-x-y}Ga_xAl_yAs$ in MQW construction with $x+y=0.47\pm0.01$, with the charge carrier layers having one value of y and the charge barrier layers having a second value of y is illustrated in FIG. 19. Because the bandgap increases for increasing Al mole fraction y, the charge barrier layers 346-1 through 346-N+1 must have a larger Al content, and hence larger value of y than do the charge carrier layers 348-1 through 348-N. The larger bandgap layers form potential barriers which result in trapping of conduction band electrons and valence band holes within the smaller bandgap layers. A lattice of InP is shown as a substrate 349 upon which the layers of $In_{1-x-y}Ga_xAl_yAs$ are epitaxially grown.

EXAMPLE 4

The use of $Ga_xIn_{1-x}P_yAs_{1-y}$ as a material for MQW construction may be understood by reference to FIG. 15. Compounds of $Ga_xIn_{1-x}P_yAs_{1-y}$ may be lattice matched to a crystal of InP by use of compositions which fall along the vertical line 300. Compositions of $Ga_xIn_{1-x}P_yAs_{1-y}$ which are lattice matched in InP as a substrate can have bandgap values between approximately 1.25 eV or 0.99 micron through approximately 0.173 eV or 1.7 micron. This bandgap range covers the range of 1.2 micron to 1.6 micron for which optical fibers have minimum losses and minimum dispersion, and are therefore particularly useful for making signal processing devices using MQW structures.

Figure 20:
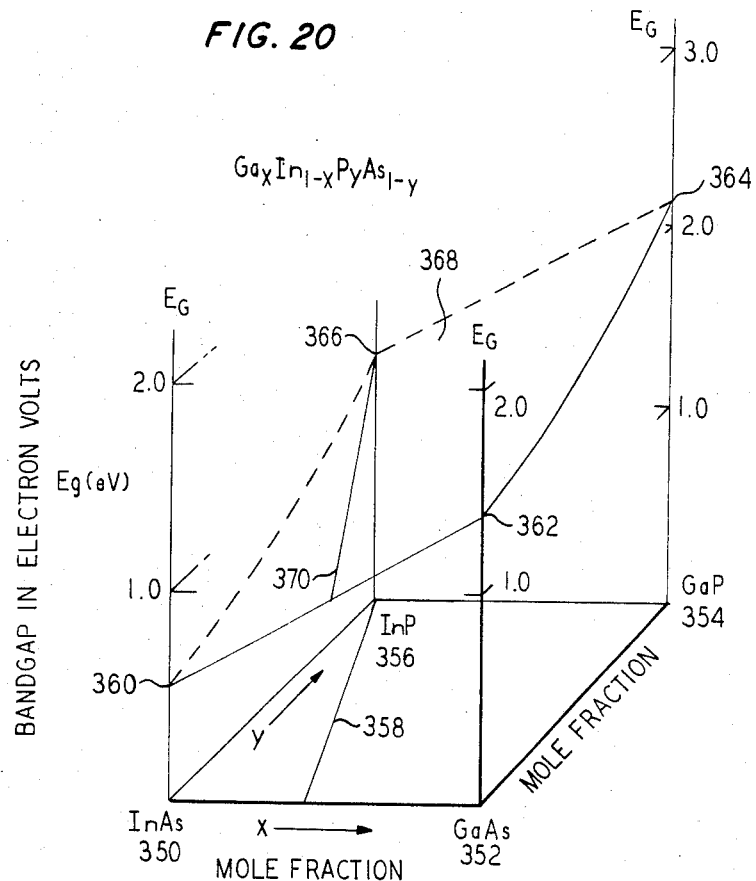
FIG. 20 is a three-dimensional representation of $Ga_xIn_{1-x}P_yAs_{1-y}$ bandgap energy plotted along the vertical axis versus mole fraction composition plotted in the horizontal plane.

Referring to FIG. 20, a three-dimensional representation of the compositional dependence of the energy gap for $Ga_xIn_{1-x}P_yAs_{1-y}$ is given. The vertices of a parallelogram represent InAs at the lower left corner 350, GaAs at the lower right corner 352, GaP at the right rear corner 354, and InP at the left rear corner 356. The compositional mole fractions which are lattice matched to InP are illustrated at line 358. The bandgap of the alloy is plotted along the vertical axis, with the bandgap of InAs at 0.420 eV 360, the bandgap of GaAs at 1.52 eV 362, the bandgap of GaP at 2.34 eV 364, and the bandgap of InP at 1.42 eV 366. The projection of the lattice match line 358 on the bandgap surface gives an intersection line 370 which gives the variation in bandgap for compositions of $GaIn_{1-x}P_yAs_{1-y}$ which are lattice matched to InP. The realizable compositions give a bandgap range of approximately 1.25 eV through 0.73 eV. Optical transitions are believed to be direct throughout this mole fraction range. FIG. 20 is adapted from the reference book by Casey and Panish, "Heterostructure Lasers Part B: Materials and Operating Characteristics", pp. 38-41, Academic Press, New York, 1978.

EXAMPLE 5

Figure 21:
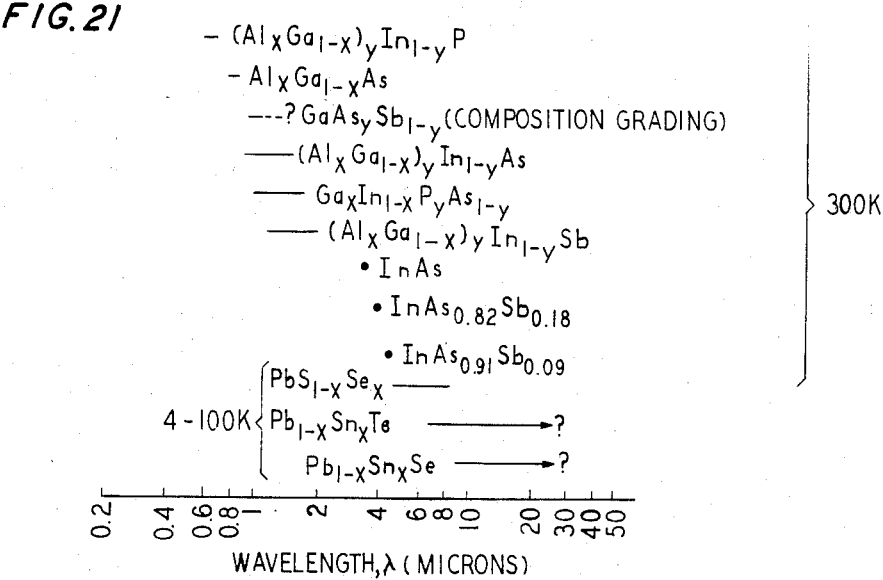
FIG. 21 is a chart showing ranges of emission wavelength for materials useful in making MQW structures.

Referring to FIG. 21, the bandgap, expressed as an emission wavelength, of several compounds which are potentially useful in making a MQW structure 120 and which may be grown epitaxially as lattice matched to a crystal substrate are illustrated. These materials are potentially useful in construction of MQW structures for use in nonlinear optical signal processing devices. The requirements for use in MQW construction are that the materials have different bandgaps so as to form potential wells in the conduction band and valence band; may be epitaxially grown with their lattice matched to the lattice of a substrate crystal; and have direct optical transitions from valence band to conduction band for a userful range of mole fractions.

EXAMPLE 6

Figure 22:
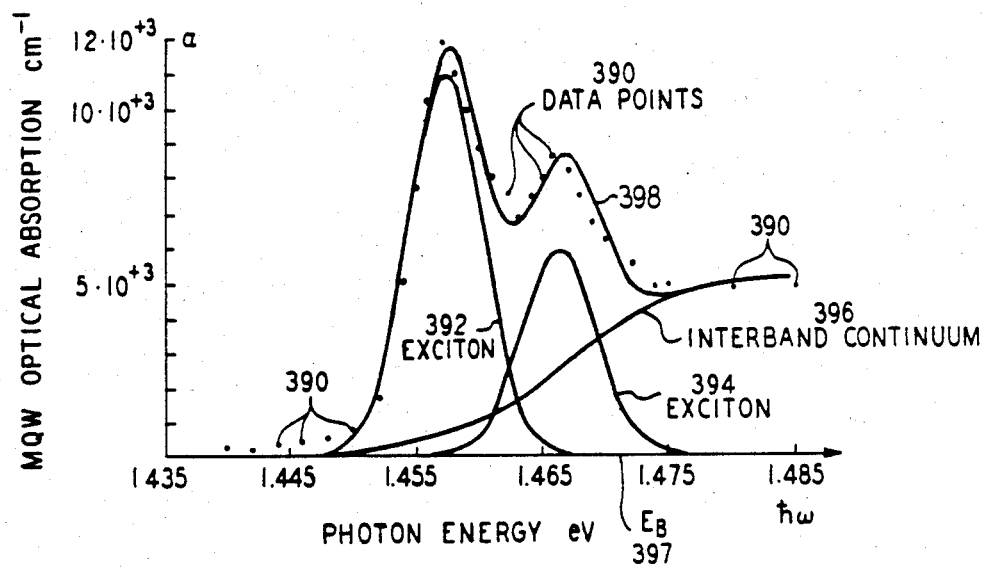
FIG. 22 is a graph showing optical transmission data taken using a GaAs-$Al_xGa_{1-x}As$ MQW and fits to the data.

Detailed optical absorption data for a MQW structure 120 fabricated from GaAs as the low bandgap material $Al_xGa_{1-x}As$ as the side bandgap material is given in FIG. 22. Data points 390 give the measured optical absorption at room temperature for the MQW device 100. The data points 390 show a peak of approximately $12 \cdot 10^3$ cm$^{-1}$ at a photon energy of 1.455 eV and a second peak of approximately $8.5 \cdot 10^3$ cm$^{-1}$ at a photon energy 1.465 eV. The data are fit by three structures, first an exciton absorption peak 392 of maximum absorption of $11 \cdot 10^3$ cm$^{-1}$ at a photon energy of 1.457 eV and linewidth of 0.003 eV, a second exciton peak 394 of maximum absorption of $6.3 \cdot 10^3$ cm$^{-1}$ at a photon energy of 1.466 eV and linewidth of 0.003 eV, and thirdly a continuum absorption curve 396 with a maximum absorption of $2.8 \cdot 10^3$ cm$^{-1}$ with a bandgap energy edge 397 at a photon energy of 1.467 eV and an energy tail of 0.005 eV. The data shown in FIG. 22 was taken at an intensity sufficiently low that no saturation of the absorption would be expected to be visible. A total fitted curve 398 is calculated by adding the contributions of the aforesaid three processes.

EXAMPLE 7

Figure 23:
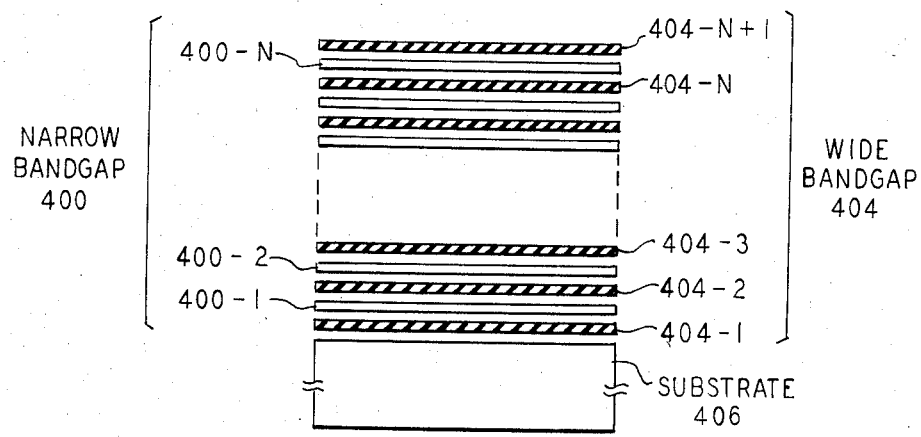
FIG. 23 is an end view of a multiple layer heterostructure.

A MQW structure may be made from epitaxially grown heterogeneous layers in which the two types of materials used are: first, a narrow bandgap semiconductor material to form charge carrier layers; and second, a wide bandgap material to form charge barrier layers. Referring to FIG. 23, there is shown epitaxially grown layers of narrow bandgap semiconductor material 400-1 to 400-N, and alternate layers of epitaxially grown wide bandgap material 404-1 to 404-N+1. Substrate 406 supports the alternate layers of narrow bandgap material 400-1 to 400-N and the layers of wide bandgap material 404-1 to 404-N+1, and the layers are grown epitaxially one upon the other. The epitaxially grown alternate layers of narrow bandgap semiconductor material 400-1 to 400-N and wide bandgap material 404-1 to 404-N+1 as shown in FIG. 23 may be conveniently referred to as a multiple layer heterostructure.

Figure 24:
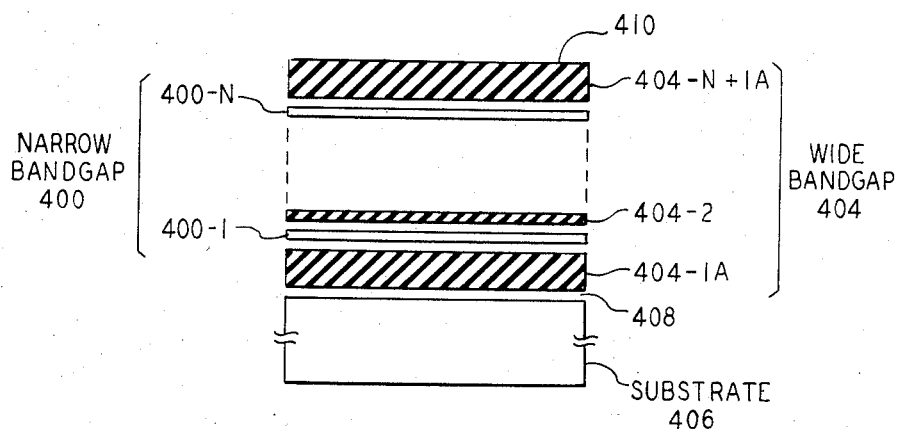
FIG. 24 is an end view of a multiple layer heterostructure and shows capping layers.

As an alternate design for a multiple layer heterostructure, there is shown in FIG. 24 capping layers 404-1A and 404-N+1A. The capping layers 404-1A and 404-N+1A are the first and last wide bandgap layers, and they are made thicker than the layers 404-2 to 404-N which separate layers of narrow bandgap material. An internal capping layer 404-1A may be epitaxially grown on substrate 406 in order, for example, to cover over any imperfections in the upper surface 408 of substrate 406. An external capping layer 404-N+1A may serve to protect the underlying thinner layers from mechanical injury. Further, the upper surface 410 of external capping layer 404-N+1A may be shipped or treated to serve as a partially reflecting mirror, or surface 410 may serve to attach the multiple layer heterostructure 412 to an external device (not shown), or surface 410 may serve as the side of an optical waveguide used to direct a beam of light to propagate substantially parallel to the layer planes 400-1 to 400-N and 404-1 to 404-N+1. Surface 410 and external capping layer 404-N+1A, or internal capping layer 404-1A, may serve additional purposes which will be apparent to those skilled in the art of optical devices.

Capping layers 404-1A and 404-N+1A correspond to the $Al_xGa_{1-x}As$ layers 118 and 124 shown in FIG. 1. Also the $In_{1-x-y}Ga_xAl_yAs$ multiple layer heterostructure shown in FIG. 19 could be made with capping layers 404-1A heterostructure. Capping layers 404-1A and 404-N+1A are normally made from the wide bandgap material which forms the charge barrier layers, and so additionally serve the function of preventing charges from leaking out of the narrow bandgap charge carrier material.

The narrow bandgap layers 400-1 to 400-N are charge carrier layers and each layer forms a quantum well. The width of the quantum well is determined by the thickness of the narrow bandgap material. The barrier height for the quantum well is determined by the difference between the conduction bands and between the valence bands of the narrow bandgap material 400-1 to 400-N and the wide bandgap material 404-1 to 404-N+1. The barrier heights at the junction between epitaxially grown narrow bandgap and wide bandgap materials are shown in FIG. 11 for the $GaAs-Al_xGa_{1-x}As$ case. In FIG. 11 both the conduction band barrier 243 and the valence band barrier 245 are shown.

The wide bandgap material used for layers 404-1 to 404-N+1 need not be a semiconductor. The layers must be epitaxially grown upon the substrate 406, and one upon the other. The charge carriers produced by photon absorption within the layers of narrow bandgap material 400-1 to 400-N then may propagate throughout the entire epitaxially grown crystal with their motion limited only by the potential barriers which occur at the boundaries of narrow bandgap material and wide bandgap material, as is shown in FIG. 11 and FIG. 14 for the $GaAs-Al_xGa_{1-x}As$ case.

EXAMPLE 8

A bistable optical device may be made by using a Fabry-Perot cavity and a multiple layer heterostructure. A bistable optical device is useful as an optical logic unit, memory unit, and for a variety of optical signal processing applications in an optical computer or lightwave communication system. The multiple layer heterostructure serves as the nonlinear optical element in the bistable optical device, referred to hereinafter as a bistable Fabry-Perot cavity (BFPC). A BFPC may be understood by reference to FIG. 25. In its simplest form a Fabry-Perot cavity consists of two plane parallel partially transmitting mirrors 420 and 422 mounted so that their planes are substantially parallel and illuminated by a light source 424 which produces an incident light beam 426 which is directed substantially perpendicular to the planes of mirrors 420 and 422. Multiple reflections of the part of incident light beam 426 transmitted by entrance mirror 420 occur between entrance mirror 420 occur between entrance mirror 420 and exit mirror 422 setting up a standing wave pattern within space 432. The standing wave pattern is produced by interference between the multiply reflected light beams within space 432 between mirrors 420 and 422. A transmitted light beam 428 is produced when the spacing d 430 between entrance mirror 420 and exit mirror 422 is an integral number of one-half wavelengths within the medium between mirrors 420 and 422. The condition for producing a transmitted light beam 428 may be expressed as:

$$(\text{integer}) \times (\lambda/n) = 2d \qquad (2)$$

where the symbols have the meaning: (integer) is an integer such as 1, 2, 3 ... 10,000, 10,001, ... etc.; $\lambda$ is the wavelength of the light photons in vacuum; n is the index of refraction of the medium filling the space 432 between entrance mirror 420 and exit mirror 422, assumed in this simple expression to be a uniform medium; and d is the distance d 430 between mirrors 420 and 422. The quantity $\lambda/n$ is the wavelength of the light within the medium which fills space 432. Simply stated, the condition for producing an output light beam 428 is that an integral number of light one-half wavelengths within the medium filling space 432 fit within distance d 430, where d is the distance between entrance mirror 420 and exit mirror 422. The condition for standing waves within distance d 430 may be met even if a medium does not completely fill space 432 so long as the total number of waves in distance 2d is an integral number of waves. Space 421 between MQW 434 and mirrors 420, 422 may contain portions of standing waves as well as may MQW 434. Detector D 433 may be used to measure the intensity of transmitted light beam 428.

A BFPC may be made by placing a nonlinear medium within the space 432 between mirrors 420 and 422. As the intensity of the incident light beam 426 is increased, the index of refraction n of the nonlinear medium in space 432 varies. As a value of n is reached which satisifies the requirement that an integral number of standing waves exists within distance 2d, then the intensity of the transmitted beam 428 increases greatly. As the intensity of the incident beam 426 is reduced, the intensity of the transmitted beam 428 will remain high as a result of resonant amplification within the Fabry-Perot cavity, until the incident intensity is reduced sufficiently that the index of refraction n of the nonlinear medium changes enough that strong standing waves cannot be sustained within the Fabry-Perot cavity. At the intensity that standing waves cannot be sustained within the Fabry-Perot cavity, the transmitted light beam 428 will switch to a low intensity. A typical characteristic curve for the BFPC is shown in FIG. 26. The transmittance of the BFPC is defined as transmittance = (intensity of transmitted light beam)/(intensity of incident light beam)

The transmitted light beam intensity of a BFPC is plotted along vertical axis 440 versus incident light beam intensity which is plotted along horizontal axis 442. The BFPC is illuminated by a low intensity incident light beam 426 at point A 444. At low intensity illumination, only a weak standing wave pattern is set up between mirrors 420 and 422. Stated simply, the light wavelength within the medium inside space 432 is not resonant with the cavity dimension d 430. As the intensity of incident light beam 426 is increased, the transmittance passes through point B 446, until at point C 448 the index of refraction n of the nonlinear medium in space 432 has changed sufficiently that strong standing waves are set up within space 432, and therefore at point C 448 the transmittance makes a sudden jump to point D 450. Further increases in intensity of incident light beam 426 carry the transmittance to point E 452. Reducing the intensity of incident light beam 426 causes the transmittance to pass first from point E 452 to point D 450 and then to point F 454 and finally to point G 456, at which intensity strong standing waves cannot be sustained within space 432 because the index of refraction has varied too much, and consequently the transmittance of the BFPS switches to its low value at point H 458. The BFPC remains in its high transmittance condition as the incident light beam intensity 426 is reduced from point D 450 to point F 454 and finally to point G 456 because resonant amplification within the Fabry-Perot cavity maintains sufficient intensity within space 432 to maintain the index of refraction adequate for maintenance of strong standing waves within space 432. A BFPC using bulk GaAs as the nonlinear material was disclosed by Gibbs et. al. in the paper "Optical Bistability in Semiconductors", *Applied Physics Letters*, Vol. 35, pp. 451, 453, Sept. 1979. However, bistable action was observed only in the temperature range from 5° K. through 120° K. and bistability disappeared above a temperature of 120° K., and also a switching intensity of about 200 milliwatts focused to a spot size of approximately 10 micron diameter for an intensity of approximately 1 milliwatt per square micron was necessary.

A clever and unexpected advance taught by the present invention is the use of an MQW 434 as the nonlinear element in a BFPC. An ideal nonlinear element for a BFPC is provided by a MQW with an absorption level shifted down from the conduction band by a sufficient multiple of the linewidth of the exciton resonance that it affords a resonant absorption peak at room temperature, and also the aforesaid resonant absorption peak saturates at low light intensities.

Referring to FIG. 8, there is shown an exciton energy level 200 with binding energy $E_B$ 201. By making the layers of narrow bandgap semiconductor material sufficiently thin, the exciton binding energy $E_B$ 201 may be increased to a sufficient multiple of the linewidth for temperatures in the T=300° K. range. When the binding energy $E_B$ 201 is a sufficient multiple of the linewidth at room temperature, then the resonant absorption transition 204 is observable at room temperature, as is shown by peak 154 in FIG. 4 which gives the absorption spectrum of a MQW. Exciton absorption transition 204 saturates at low light intensity as shown in curve 182 in FIG. 6, and therefore leads to significant variations in index of refraction of the MQW at low light intensities. Stated simply, the value of $n_2$ for a MQW at room temperature is large.

A short explanation for the large $n_2$ of a MQW is: first, the exciton production transition 204 shown in FIG. 8 is observable at room temperature because the binding energy $E_B$ 201 is increased to a sufficient multiple of the linewidth by the thinness of the narrow bandgap material and also the quantum wells formed by the alternate layers of narrow and wide bandgap materials; second, the exciton, once formed, is ionized by a lattice vibration phonon to form an electron 206 in the conduction band 194 and a hole 208 in the valence band 192; third, a negative feedback mechanism operates in which the electron 206 and the hole 208 act to reduce the probability for an exciton forming absorption transition 204; fourth, the decrease in absorption is accompanied by a change in index of refraction of the MQW. The mechanism of inhibiting exciton forming transitions 204 may be activated by producing conduction band electrons 206 and valence band holes 208 by means other than exciton production, as for example by direct interband optical transitions 220, or by electrical carrier injection, etc.

EXAMPLE 9

An alternate design for a BFPC using a MQW is shown in FIG. 27. Entrance mirror 420A and exit mirror 422A are partially reflecting mirrors made by depositing a layer of reflective material on a planar side of MQW 434. The external surfaces of MQW 434 are shaped to be substantially planar, parallel to the layer planes of MQW 434, and parallel to each other. Then a layer of reflecting material may be deposited on one or both opposite planar sides of MQW 434 in order to increase the reflectivity of surfaces 420A and 422A.

EXAMPLE 10

Figure 28:
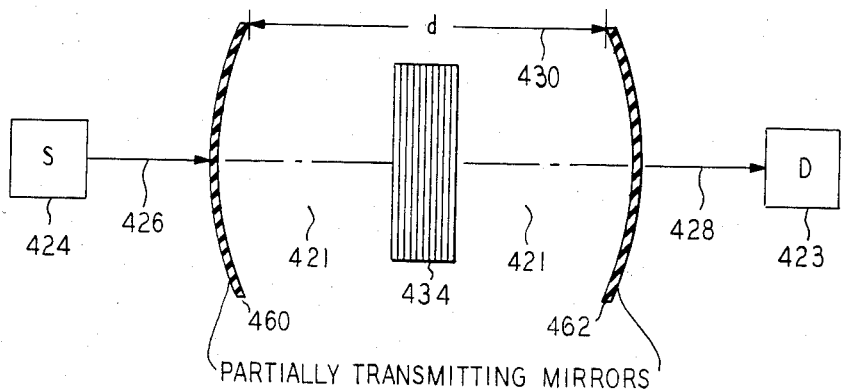
FIG. 28 is a side view of a bistable Fabry-Perot cavity with focusing mirrors.

An alternate design for a BFPC using MQW 434 as the nonlinear element is shown in FIG. 28. The Fabry-Perot cavity is formed from focusing mirrors 460 and 462.

EXAMPLE 11

Figure 29:
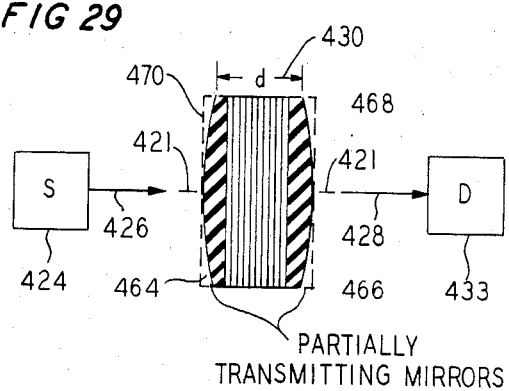
FIG. 29 is a side view of a bistable Fabry-Perot cavity with focusing mirrors made by forming and treating the exterior surfaces of a MQW.

An alternate design for a BFPC using MQW 434 is shown in FIG. 29. Focusing mirrors are made by shaping the external surfaces of MQW 434 to form curved surfaces 464 and 466. Dotted lines 468, 470 show a contour which represents material which may be removed from flat capping layers 404-1A and 404-N+1A as shown in FIG. 24 in order to form curved mirror surfaces 464 and 466. A layer of reflecting material may be deposited on mirror surfaces 464 and 466 in order to increase the reflectivity of surfaces 464 and 466.

EXAMPLE 12

Figure 30:
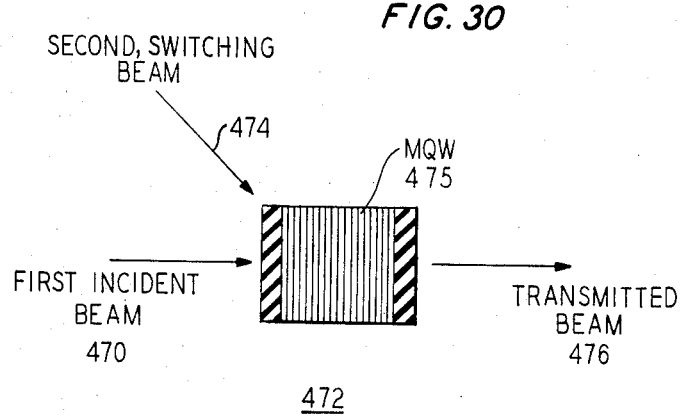
FIG. 30 is a bistable Fabry-Perot cavity with a second switching optical beam.
Figure 31:
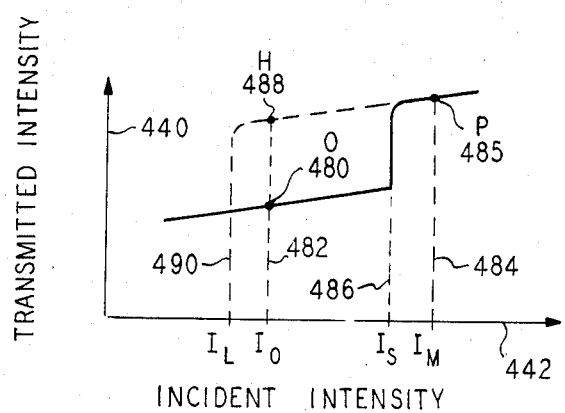
FIG. 31 is an operating curve for a bistable Fabry-Perot cavity which utilizes two optical beams.

A BFPC may be used as an optical switch as shown in FIG. 30. A first incident light beam 470 which is arranged to be transmitted by a BFPC 472 may be switched from a condition of low transmission to a condition of high transmission by a second switching light beam 474. Simply put, the BFPC 472 is switched from low to high transmission by second light beam 474. After the switching is accomplished, the second light beam 474 may be turned off and the BFPC 472 remains in the high transmission state with the first light beam 470 maintaining sufficient illumination in the BFPC to prevent it from switching into the low transmission state. Alternatively, a BFPC may be switched into a low transmission state by reducing the illumination below the threshold needed to maintain resonance within the BFPC. Bistable switching may be understood by reference to the operating curve shown in FIG. 31. The coordinate axes are displayed as shown in FIG. 26. Incident light beam 470 maintains the BFPC 472 at point O 480 by being adjusted to intensity $I_o$ 482. Switching beam 474 increases the illumination within the BFPC to $I_m$ 484 and brings the BFPC to operating point P 485, and therefore causes the BFPC to switch to the high transmission state at illumination intensity $I_s$ 486. Turning switching beam 474 off then causes the operating point to shift to point H 488, at which the BFPC 472 remains in the high transmission state. If the first incident beam 470 is reduced in intensity below the intensity $I_L$ 490, then BFPC 472 will switch into its low transmission state. Room temperature operation of the BFPC and bistability may be achieved using a diode laser light source by using a MQW 475 as the nonlinear element of the BFPC 472.

EXAMPLE 13

A nonlinear optical device may be made using a Fabry-Perot cavity containing a MQW, and will be referred to as a nonlinear Fabry-Perot cavity (NFPC). The MQW serves as the nonlinear optical element of the NFPC. The NFPC does not exhibit optical bistability with the light intensity utilized, and may therefore be distinguished from the BFPC. The physical structure of the NFPC is similar to that of the BFPC, and a NFPC may be represented by FIG. 25 or FIG. 27 or FIG. 28 or FIG. 29. The NFPC is obtained from the structure shown in FIG. 25 or FIG. 27 or FIG. 28 or FIG. 29 by adjusting operating parameters such as the reflectivity of mirror 420, the reflectivity of mirror 422, the distance d 430 between the reflecting surfaces, the linear index of refraction $n_L$, the nonlinear index of refraction $n_2$, the linear absorption coefficient $\alpha$, and the nonlinear absorption coefficient $\alpha_2$, in order to adjust the gain. A mathematical treatment of the operation of a Fabry-Perot cavity is given by Miller in the article "Refractive Fabry-Perot Bistability with Linear Absorption: Theory of Operation and Cavity Optimization", in *IEEE Journal of Quantum Electronics*, Vol. QE-17, No. 3, March 1981, page 306, and bistable operation of a Fabry-Perot cavity is further described by Miller et al. in the article "Optical Bistability in Semiconductors", *IEEE Journal of Quantum Electronics*, Vol. QE-17, No. 3, March 1981, page 312.

Figure 32:
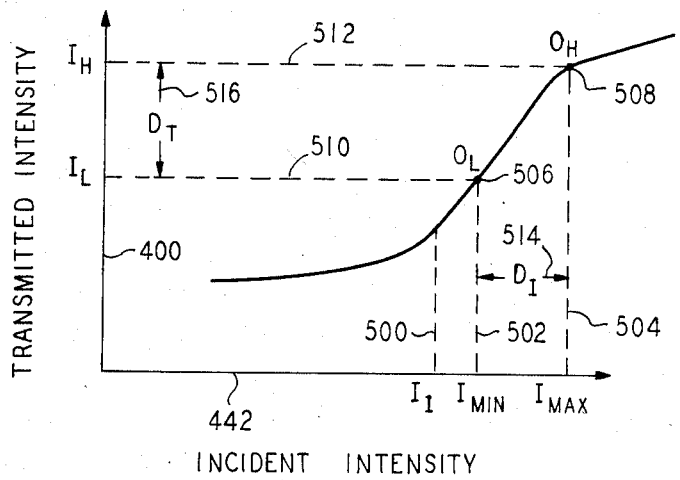
FIG. 32 is an operating curve for a nonlinear Fabry-Perot cavity showing amplification.

An optical amplifier may be made using a NFPC, and room temperature operation with a diode laser may be obtained by using a MQW as the nonlinear element of the NFPC. Referring to FIG. 25, an optical amplifier using a single light beam may be made. An operating characteristic for a NFPC used as an optical amplifier is shown in FIG. 32. Incident light beam 426 is considered to have two components: a time independent intensity component $I_I$ 500; and a fluctuating intensity component in which the intensity varies as a function of time. The fluctuating intensity component causes the intensioy of incident light beam 426 to vary from $I_{min}$ 502 to $I_{max}$ 504. Thus the time independent component $I_I$ 500 biases the NFPC so that the light wavelength within the Fabry-Perot cavity is almost at resonance. The fluctuating component of incident light beam 426 drives the NFPC between two operating points, the low operating point $O_L$ 506 and the high operating point $O_H$ 508. The transmitted beam 428 will fluctuate in intensity between a low intensity of $I_L$ 510 and a high intensity of $I_H$ 512. The difference between the minimum and maximum incident intensity, $D_I$ 514, is less than the difference in transmitted intensity fluctuations, $D_T$ 516, because of the steep part of the characteristic curve near the intensity at which the NFPC switches from low transmission to high transmission. The NFPC amplifier gain is defined as:

$$\text{Gain} = (D_T/D_I). \quad (3)$$

Stated simply, the NFPC provides gain in the fluctuations of a single incident light beam which has a time independent component of sufficient intensity to bias the NFPC near its switching intensity. The NFPC using a MQW as the nonlinear optical element will work at room temperature using a diode laser light source.

EXAMPLE 14

An alternate embodiment of an optical amplifier employs a NFPC and two incident light beams. Referring to FIG. 30, there is shown a NFPC 472 with an incident light beam 470 and a second light beam 474. In the bistable optical switch, light beam 474 served as a switching beam. Light beam 470 may be used as a time independent intensity beam which biases the NFPC to the neighborhood of intensity $I_f$ 500 as given in FIG. 32. Light beam 474 may then be a weak beam of light with a varying intensity. The sum of time independent components of the two light beams biases the NFPC 472 to point $I_f$ 500. The varying component of light beam 474 causes the illumination of NFPC 472 to vary between intensity $I_{min}$ 502 and $I_{max}$ 504. The transmitted beam 476 will then vary in intensity between a low intensity $I_L$ 510 and a high intensity $I_H$ 512. The total incident intensity then has fluctuations of amount $D_I$ 514 and the transmitted intensity has fluctuations of amount $D_T$ 516, and the gain of the two light beam optical amplifiers is given by $$\text{Gain} = (D_T/D_I). \quad (4)$$

EXAMPLE 15

An optical amplifier may be made using a NFPC in which incident light beam 470 has intensity fluctuations and light beam 474 has a time independent intensity, such that the time independent components of the two light beams 470 and 474 bias the NFPC to operating point $I_f$ 500 as shown in FIG. 30 and FIG. 32.

EXAMPLE 16

Figure 33:
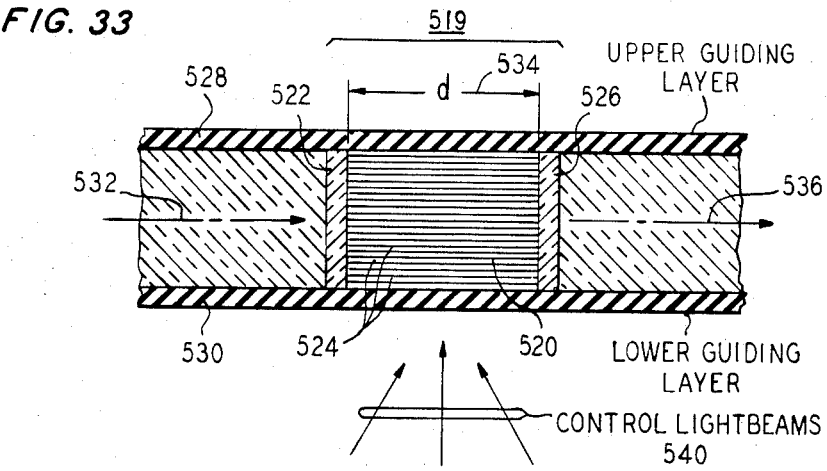
FIG. 33 is a bistable Fabry-Perot cavity with mirrors perpendicular to the layer planes of a MQW.

An alternate design for a NFPC or BFPC 519 may be understood by reference to FIG. 33. A MQW 520 serves as the nonlinear element of the NFPC or BFPC 519. Entrance mirror 522 is made substantially perpendicular to the layer planes 524 of MQW 520. Also exit mirror 526 is made substantially perpendicular to the layer planes 524 of MQW 520. A light waveguide with upper guiding layer 528 and lower guiding layer 530 serves to guide incident light beam 532 into the cavity 519 with the propagation direction substantially perpendicular to mirrors 522 and 526 and also substantially parallel to layer planes 524 of MQW 520. Standing waves are set up in the space between entrance mirror 522 and exit mirror 526 when the intensity of incident light beam 532 is great enough so that the index of refraction of MQW 520 causes the photon wavelength within MQW 520 to have an integral number of waves within distance D 534 separating mirrors 522 and 526. Transmitted light beam 536 is transmitted by cavity 519. BFPC 519 has an operating characteristic as shown in FIG. 26, and undergoes a transition to a high transmission state at point C 448 as a standing wave pattern is developed within BFPC 519 as a result of varying the intensity of incident light beam 532. Also, BFPC 519 shows a transition to a low transmission state at point G 456 as the intensity of incident light beam 532 is reduced. A BFPC or NFPC in which the incident light beam 532 is directed parallel to the MQW layer planes as in BFPC 519 may be used to construct optical amplifiers, switches, etc., as discussed hereinabove. For example, a control light beam 540 may be directed at MQW 520 from a convenient direction for the purpose of making optical switches, amplifiers, etc. Often included in the nonlinear optical apparatus is a means for varying an illumination intensity within the multiple layer heterostructure in order to vary an optical absorption and an index of refraction of the multiple layer heterostructure for light photons.

EXAMPLE 17

Figure 34:
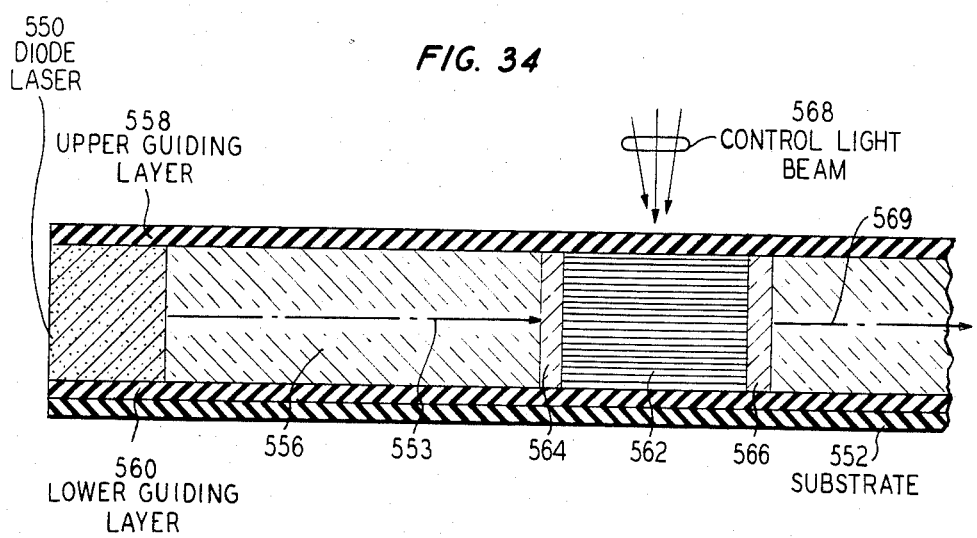
FIG. 34 is a diode laser and a MQW grown on the same substrate, with BFPC mirrors perpendicular to the layer planes.

Referring to FIG. 34, there is shown a diode laser 550 grown upon substrate 552. Light beam 553 produced by laser 550 propagates through the optical waveguide 556 defined by the upper guiding layer 558 and the lower guiding layer 560. Light beam 553 impinges upon and enters MQW 562. MQW 562 may be used in a Fabry-Perot cavity by use of entrance mirror 564 and exit mirror 566. Both the diode laser 550 and the MQW 562 may be grown on the same substrate 552. In the embodiment shown in FIG. 34, the substrate 552 may serve as the lower guiding layer 560 for the optical waveguide 556. Control beam 568 may be used to switch output beam 569, as an input beam with intensity modulation to be amplified onto output beam 569, or for other optical control purposes. A great advantage to the use of an MQW as taught by the present invention is that the materials out of which the layers of the MQW are fabricated are the same or quite similar materials out of which diode lasers are fabricated. It is therefore very natural to grow diode lasers and MQW structures on the same substrate. A further natural advantage of the use of the same or similar materials for diode lasers and MQW structures for nonlinear optical signal processing devices is that the light frequency produced by the diode laser will be the required frequency for operation of the MQW. The diode laser output frequency and the exciton absorption frequency can be tuned to match each other.

EXAMPLE 18

Figure 35:
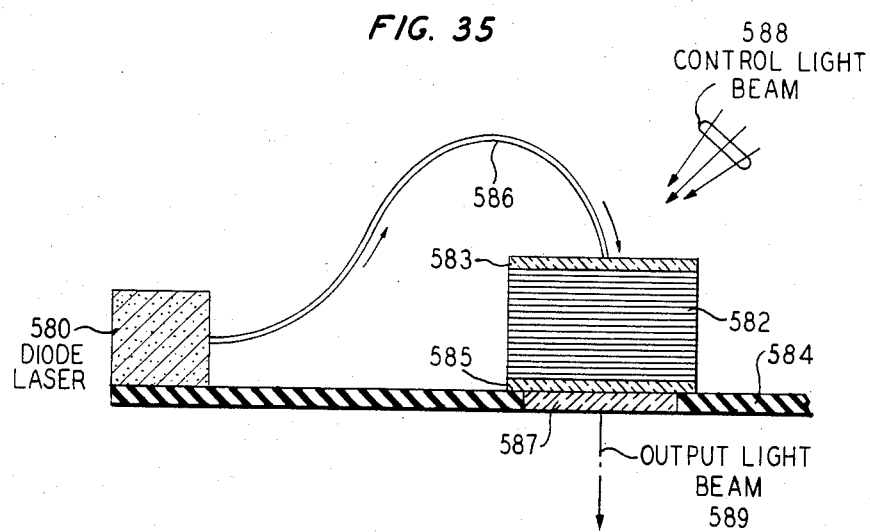
FIG. 35 is a diode laser and a MQW grown on the same substrate with BFPC mirrors parallel to the layer planes, and an optical fiber waveguide.

Referring to FIG. 35, there is shown an embodiment of a diode laser 580 and an MQW 582 grown on the same substrate 584. Optical fiber 586 serves to guide the output light beam from diode laser 580 to MQW 582. The light output from optical fiber 586 is directed so that it propagates substantially perpendicular to the layer planes of MQW 582. MQW 582 may be used in a Fabry-Perot cavity using entrance mirror 583 and exit mirror 585, and may be used as either a BFPC or an NFPC. The output light beam 589 may emerge from MQW 582 through exit window 587. Control light beam 588 may be used to vary the illumination intensity within MQW 582.

EXAMPLE 19

Figure 36:
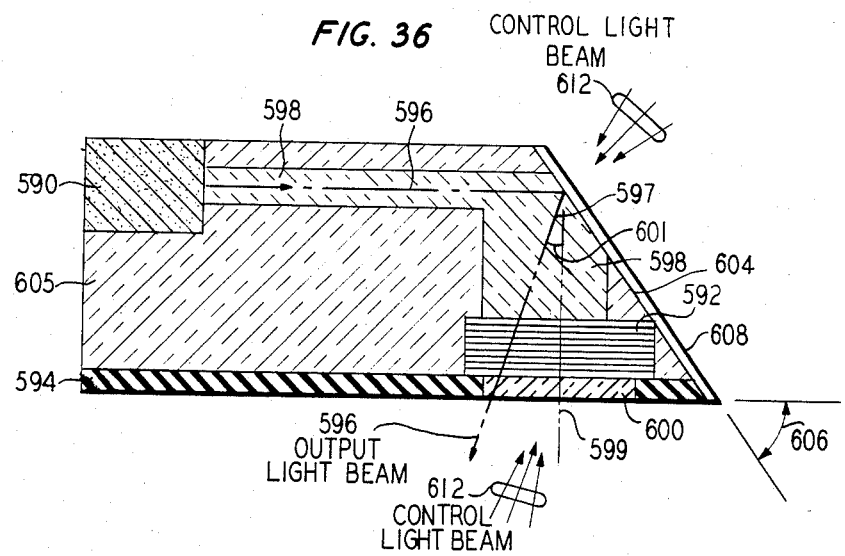
FIG. 36 is a diode laser and a MQW grown on the same substrate with an optical waveguide.

Referring to FIG. 36, there is shown a diode laser 590 and a MQW 592 grown on the same substrate 594. Light beam 596 which emerges from diode laser 590 is guided by optical waveguide 598 to impinge upon MQW 592 in a direction approximately perpendicular to the layer planes of MQW 592. The output light beam emerges through exit window 600.

Figure 37:
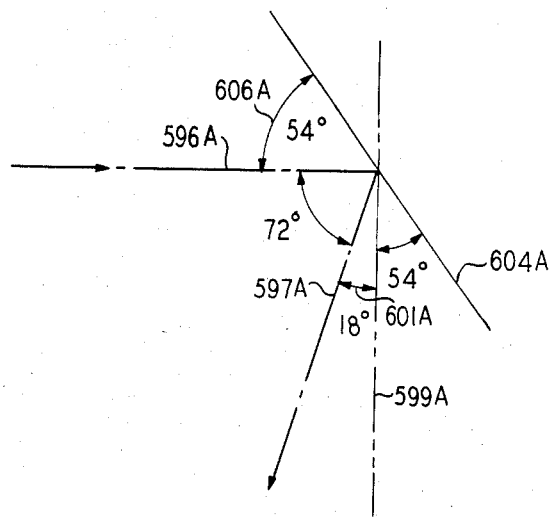
FIG. 37 is a schematic diagram showing the light beam reflection geometry of FIG. 36.

Surface 604 is obtained by cleaving or etching the bulk crystalline material 605. For example, in a GaAs-$Al_xGa_{1-x}As$ device, surface 604 is obtained by cleaving or etching the GaAs crystalline material 605 along the [111] crystalline plane to form angle 606 at ~54°. Other crystallographic planes may be conveniently chosen from which mirrors can be made at other values of angle 606. Surface 604 serves as a mirror to reflect light beam 596. Surface 604 may be coated as shown by layer 608 to improve the reflectivity of surface 604. Surface 604 may conveniently be coincident with a crystallographic plane, as, for example, the GaAs [111] plane, and reflected beam 597 will in general not be directed perpendicular to substrate 594 or to the layer planes of MQW 592. For example, in the GaAs case, angle 601 between reflected beam 597 and line 599 drawn perpendicular to the substrate 594 will be substantially 18°. Referring to FIG. 37, the reflective geometry is shown schematically for the GaAs case in which line 596A represents light beam 596, line 604A represents surface 604, along the [111] crystallographic plane, and angle 606A is determined as 54° by the crystallographic structure of GaAs. Line 597A represents reflected beam 597, and reflective angle 601A is shown to be 18°. However, because reflective angle 601, 601A is small, the electric field vector of reflected light beam 596, 597 will have its major component parallel with the planes of MQW 592. Further, waveguide 598 will guide reflected beam 596, 597 into MQW 592 in a direction substantially perpendicular to the layer planes of MQW 592. Other crystallographic materials may have angle 606 at a different value from 54°, however, because waveguide 598 will guide reflected beam 596, 597 in a direction substantially perpendicular to the layer planes of MQW 592, the major component of the electric field vector of reflected beam 596, 597 will be parallel to the layer planes of MQW 592. The index of refraction of the material within waveguide 598 is normally chosen to be less than the index of refraction of the crystalline material 605 in order to achieve optical guiding within waveguide 598. Control light beam 612 may be used to control the illumination intensity within MQW 592.

EXAMPLE 20

Figure 38:
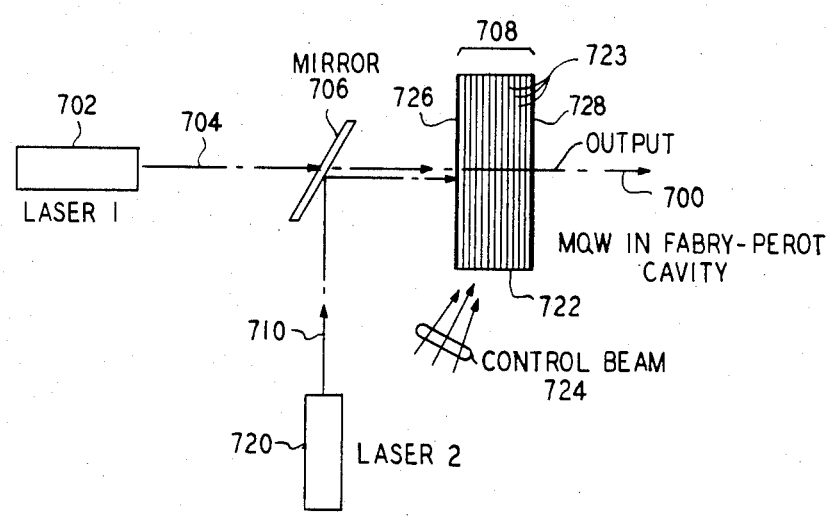
FIG. 38 is a schematic diagram showing control of a diode laser output by a BFPC.

Referring to FIG. 38, there is shown control of an output beam 700 arising from a laser 1 702. The direct output beam 704 from laser 1 702 passes through mirror 706 and NFPC 708. The output beam 710 from laser 2 720, after reflection from mirror 706, switches the transmission of NFPC 708 by causing the index of refraction of MQW 722 to change. Additionally, control light beam 724 may be used to switch the transmissivity of NFPC 708. When control beam 724 is employed to switch the transmission of NFPC 708, then output beam 700 may be a mixture of beam 704 from laser 1 702 and beam 710 from laser 2 720. In FIG. 38 the layer planes 723 of MQW 722 are shown substantially parallel to entrance mirror 726 and exit mirror 728. Alternatively, the layer planes of MQW 722 may be arranged substantially perpendicular to entrance mirror 726 and exit mirror 728, as shown in FIG. 33 and FIG. 34.

EXAMPLE 21

Figure 39:
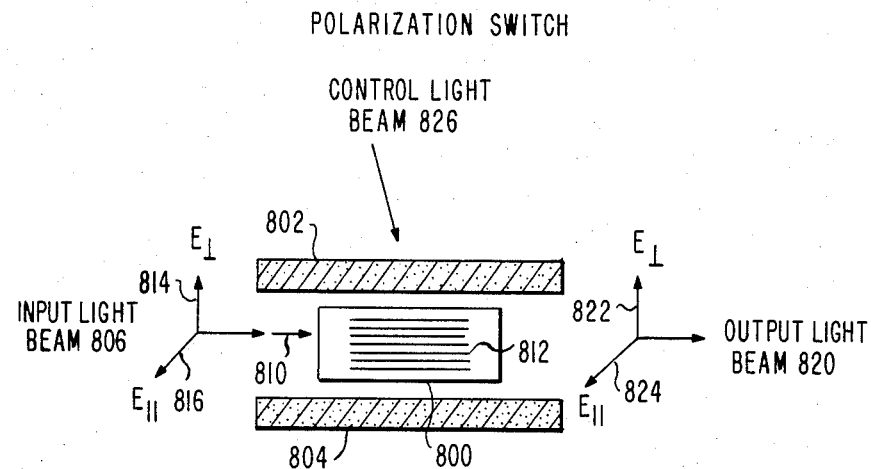
FIG. 39 is a schematic showing a cross section of a polarization switch.

Referring to FIG. 39, there is shown an exemplary embodiment of the invention as a polarization switch. An exemplary embodiment of a polarization switch is a multiple quantum well with a light beam directed substantially parallel to the layers. Components of the electric field of the light beam may be resolved either parallel to or perpendicular to the layers of the multiple quantum well. The optical absorption is in general different for the two components. Also, the index of refraction is in general different for the two components. In addition, the variation in both optical absorption and index of refraction for the two components is different, where the variation is caused by variation in the internal illumination intensity within the quantum well layers. Thus the quantum well layers have a complex form of birefringence. The device, therefore, is a means for selectively controlling the different components of polarization of the incident light beam.

In FIG. 39, MQW 800 lies between optional optical waveguide cladding layers 802, 804. Input light beam 806 propagates in direction 810. The layer planes 812 of MQW 800 are oriented substantially parallel to the light propagation direction 810. A component of the electric field of the input light beam may be oriented perpendicular to the layer planes 812, as along axis 814. Also a component of the electric field of the input light beam may be oriented parallel to the layer planes 812, as along axis 816. The electric field of the output light beam 820 may correspondingly be resolved into a component perpendicular to the layer planes 812 as along axis 822, and into a component parallel to the layer planes 812 as along axis 824. The optical transmission of MQW 800 for the two components 814, 816 is different, as is also the index of refraction. Both the optical transmission and index of refraction may be caused to change by varying the internal illumination of MQW 800. The changes of both absorption and index of refraction will, in general, be different for the two polarization components 814, 816 of input light beam 810. Thus, by selecting the polarization of input light beam 816, it is possible to selectively control the intensity of the separate polarization components 822, 824 of output light beam 820. The above analysis is stated in terms of rectangular resolution of the electric field of the light beam. Also circular polarization or elliptical polarization of the input light beam 806 could be used in a corresponding analysis of the birefringence of MQW 800, and also the variation of the birefringence with internal illumination intensity of MQW 800. The change in internal illumination of MQW 800 can be made by changing the intensity of incident light beam 806, or by use of an external control light beam 826. The use of control light beam 826 is optional.

EXAMPLE 22

Figure 40:
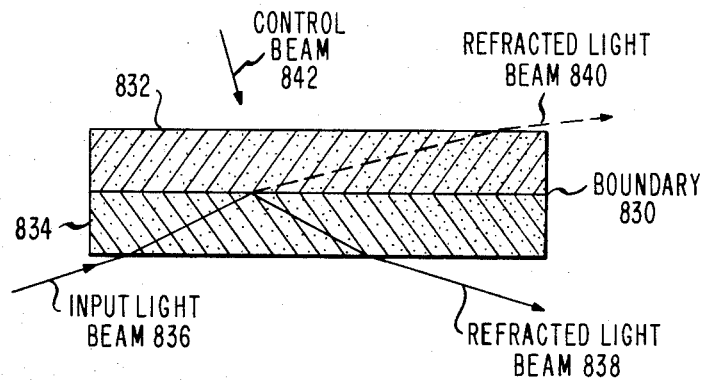
FIG. 40 is a schematic showing a cross section of a nonlinear interface.

Referring to FIG. 40, there is shown an exemplary embodiment of the invention as a nonlinear interface. A nonlinear interface is a boundary between two materials, and the boundary can be switched between a state of total internal reflection and a state of transmission. Switching is done by changing the index of refraction of one of the materials by varying the intensity of illumination within the material. Either the intensity of the incident beam may be used to control the index of refraction, or an external control light beam may be used to control the index of refraction.

Boundary 830 is formed between the two material layers 832, 834. Input light beam 836 enters material layer 834 and strikes boundary 830 where it reflects to make reflected beam 838. Total internal reflection occurs at boundary 830 if the appropriate conditions are met. When the conditions for total internal reflection are met no refracted beam 840 is produced. Refracted beam 840 is shown as a dashed line because it is not produced under conditions of total internal reflection. The condition for total internal reflection is that $\theta$ be greater than $\theta_1$ as defined below:

$$n_1 \sin \theta_1 = n_3 \tag{5}$$

Here, $n_1$ is the index of refraction in the first material layer 834, $\theta$ is the angle of incidence in material layer 834 relative to the normal to the interface, and $n_3$ is the index of refraction in the second material layer 832. In an embodiment in which input light beam 836 is the only light beam incident on material layers 832, 834, then the intensity of input light beam 836 is caused to change. The change in intensity causes a change in the index of refraction of material layer 834. The change in index of refraction changes the boundary 830 with respect to the condition for total internal reflection, and causes the boundary to switch from a state of transmission to a state of total internal reflection, or vice-versa.

In a state of total internal reflection, the intensity of reflected light beam 838 is large, and when boundary 830 is switched to a state of transmission then refracted light beam 840 carries away light energy and the intensity of reflected light beam 838 drops by a corresponding amount. Conversely, when the index of refraction of material layer 834 changes so that the condition for total internal reflection is met at boundary 830, then the intensity of reflected light beam 838 increases greatly because no energy propagates along the direction of refraction.

An alternative mode of operation is to use control light beam 842 to cause the variation of the index of refraction. A control light beam can be used to cause a variation in the index of refraction of either material layer 834 or material layer 832. A MQW is an ideal material to use for the material layer in which the index of refraction is caused to vary by a change in internal illumination intensity.

EXAMPLE 23

Figure 41:
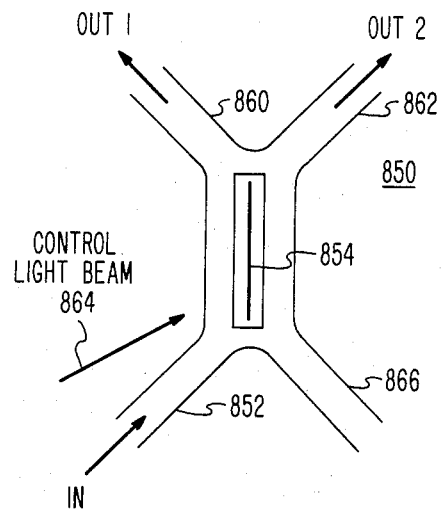
FIG. 41 is a schematic showing a waveguide coupler.

Referring to FIG. 41, there is shown an exemplary embodiment of the invention as a waveguide coupler. A waveguide coupler is a variable index of refraction material located between at least two optical waveguides. When the index of refraction has one value the light beam is coupled into one waveguide. When the index of refraction has another value, the light beam is coupled into another waveguide. A multiple quantum well is ideally suited as the material with a variable index of refraction. FIG. 41 shows an exemplary embodiment in which two waveguides are coupled and light enters along one of the waveguides.

Light enters the waveguide coupler 850 along waveguide 852. A material 854 has a variable index of refraction. For one value of the index of refraction light leaves the waveguide coupler 850 along waveguide No. 1, 860. For a different value of the index of refraction light leaves the waveguide coupler 850 along waveguide No. 2, 862. A MQW is ideal for use as the material 854 with a variable index of refraction. In FIG. 41 the planes of the layers are oriented perpendicular to the plane of the drawing. The index of refraction of the MQW can be changed by a change in the internal illumination of the MQW. The internal illumination can be changed either by a change in intensity of the input light beam, or by use of a control light beam 864. A control light beam can be made to enter the MQW from outside of waveguide coupler 850, or can be directed along one of the waveguides 852, 860, 862, 866. The optical frequency of the control light beam may be the same as the optical frequency of the input light beam, or the optical frequency of the control light beam may differ from that of the input light beam.

THEORY

The present invention discloses the use of a MQW as the nonlinear element in a bistable optical device, particularly a BFPC or NFPC. The MQW has a number of desirable features including: (1) a resonant absorption peak in the MQW optical absorption spectrum which is observable at room temperature as a separate peak occurring at an energy below the interband transitions; (2) the resonant absorption is saturable at low light intensity; (3) the saturability is accompanied by a variation in the index of refraction; (4) the materials used to make the MQW are the same as those used to make heterostructure diode lasers, and so the laser and the MQW can be grown on the same substrate to form an integrated optical system; (5) the absorption peak of the MQW may be tuned to a convenient energy by varying the alloy composition of the layers of the MQW or by varying the thickness of the narrow bandgap layers; (6) the optical absorption of the MQW may be controlled using a second light source to saturate the resonant absorption, and the second light source need not emit light at the resonant absorption frequency; and other useful features.

It is believed that the resonant absorption which makes the MQW useful in nonlinear optical devices at room temperature is due to absorption accompanied with exciton creation. There follows an explanation of observed MQW optical properties in terms of an exciton absorption model.

A MQW may be made by building up alternate layers of a narrow bandgap semiconductor material and a wide bandgap material. The narrow bandgap material then serves as a charge carrier material. Charge carriers are produced within the narrow bandgap semiconductor material by photon absorption. The wide bandgap material serves as a charge barrier material. The narrow and wide bandgap materials are grown epitaxially one upon the other in thin layers of only a few tens to hundreds of Angstroms thickness. Many alternate layers of narrow and wide bandgap materials are employed in fabricating a MQW structure. The layers of wide bandgap material serve as charge barrier planes which trap the charge carriers within the thin layers of narrow bandgap materials.

Optical resonance absorption peaks 154 and 156 are observed at room temperature in the MQW absorption spectrum as shown in FIG. 4 in a $GaAs-Al_xGa_{1-x}As$ MQW. The low energy resonance 154 is observed to saturate at low incident light intensity, as shown in FIG. 6. This resonance is believed to be due to an exciton formed in the charge carrier, or narrow bandgap, material. The exciton is formed simultaneously with the absorption of a photon in the narrow bandgap material, as shown by transition 204 in FIG. 8. An exciton is an electron and a hole bound together by Coulomb attraction such as an electron is bound to a proton in a hydrogen atom. The exciton is formed within a solid and so the dielectric constant of that solid affects the binding energy of the exciton.

The exciton level 200 is shifted away from the conduction band of the narrow bandgap material by an amount equal to the exciton binding energy $E_B$ 201. For bulk GaAs the exciton binding energy is approximately 4.2 meV and the orbit radius is approximately 140 Angstroms. The binding energy of the exciton $E_B$ 201 is increased as a result of quantum effects arising from trapping of charge carriers within the thin layers of the narrow bandgap material. Layers of narrow bandgap material with thickness of the order of the diameter of an exciton orbit radius in bulk samples of the narrow bandgap material are employed. This increased binding energy $E_B$ 201 of the exciton and the consequent increased shift of the exciton level below the conduction band makes the exciton absorption resonance transition 204 observable at room temperature in an MQW. In a particular embodiment, the layers of GaAs were 102 Angstroms, the layers of $Al_{0.28}Ga_{0.72}As$ were 207 Angstroms, the heavy hole exciton binding energy was 9 meV with an exciton orbit radius of 60 Angstroms, and exciton peaks were observed at resonant energies of approximately 1.463 electron volts and 1.474 electron volts. The 1.463 eV resonant peak is thought to arise from the "light hole exciton" and the 1.474 eV resonant peak is thought to arise from the "heavy hole exciton". In a material such as GaAs in which there is more than one valence band, each valence band may serve to form an exciton, and a terminology which emphasizes the effective mass of the hole is used to distinguish the different possibilities such as the "heavy hole exciton" or the "light hole exciton".

An exciton, once formed as a result of photon absorption, has a relatively short lifetime at room temperature. The exciton is most probably ionized by a lattice vibration phonon at room temperature. The mean time to ionization of an exciton by a phonon is estimated to be $0.4 \times 10^{-12}$ sec. in GaAs at room temperature.

Enough layers of narrow bandgap material are utilized to supply the necessary optical absorption for device design. The resonant exciton absorption leads to a frequency dependent index of refraction which is related approximately to the aforesaid absorption by the Kramers-Kronig relationship as shown in FIG. 13.

Further, the absorption of light by production of excitons is believed to saturate at low light intensities because excitons which are formed by absorption of a light photon have a short lifetime at room temperature. The exciton is ionized by a phonon which supplies the necessary energy. The exciton breaks apart upon ionization into a conduction band electron 206 and a valence band hole 208 as shown in FIG. 8. The lifetime of the conduction band electron and valence band hole is believed to be rather long at room temperature, approximately $21.10^{-9}$ sec. in the GaAs layers of MQW at room temperature. Therefore the population of electrons and holes will build up as more and more excitons are created by photon absorption and destroyed by phonon ionization. However, conduction band electrons and valence band holes comprise mobile charges within the semiconductor material. These charges affect the dielectric constant of the semiconductor material and thereby interfere with the formation of more excitons through a screening effect. Thus as excitons are created, they are believed to break apart and the resulting electrons and holes interfere with the production of more excitons. A negative feedback mechanism is therefore operative in which the creation of excitons makes further production of excitons less probable, and the resonant optical absorption decreases. The resonant optical absorption decreases when the rate at which excitons are formed exceeds the rate at which free electrons and holes recombine with a consequent increase in the population of conduction band electrons and valence band holes which behave as free charge carriers.

In summary, optical absorption which depends upon creation of excitons saturates with increasing light intensity. Saturation occurs because a previously formed exciton breaks apart forming an electron and hole which interfere with and partially prevent the formation of new excitons.

Additional mechanisms by which exciton absorption may saturate include exciton-exciton collisions and also exhaustion of potential exciton-forming states in the conduction and valence bands. However, these mechanisms are believed to be unlikely at temperatures above $\simeq 150°$ K. due to rapid ionization of excitons.

A second beam of light may be used to increase the density of charge carriers within the narrow bandgap semiconductor material and therefore reduce the probability of exciton formation. A control beam 474 is shown in FIG. 30, a control beam 540 is shown in FIG. 33, and control beams are also shown in FIGS. 34, 35, and 36. The MQW can then be used as a light valve in which its optical transmission is controlled by a second beam of light. The second beam of light undergoes photon absorption by any process, such as interband absorption or exciton absorption and therefore produces conduction band electrons and valence band holes. These conduction band electrons and valence band holes are free charge carriers which interfere with exciton production.

The energy of the photons in the second beam of light may exceed the bandgap energy, $E_G$ 242 as shown in FIG. 11 and FIG. 14, of the wide bandgap charge barrier material. Charge carriers produced in the wide bandgap material by photon absorption will interfere with exciton production especially once they have migrated into the charge carrier material, and therefore reduce the resonant absorption due to exciton production. It is believed that as the resonant optical absorption decreases due to saturation effects, the index of refraction will also vary with the reduced absorption as given by the Kramers-Kronig relationship, and as shown in FIGS. 12 and 13.

Useful materials for making a multiple layer heterostructure include the following: GaAs/AlGaAs; AlGaAs/AlGaAs; InGaAs; InGaAlAs; InGaAsP; HgCdTe; GaSb; AlGaSb, other III-V semiconductor materials and alloys, and Si and Ge.

It is to be understood that the above-described embodiments are simply illustrative of the principles of the invention. Various other modifications and changes may be made by those skilled in the art which will embody the principles of the invention and fall within the spirit and scope thereof.

What is claimed is:

1. A nonlinear optical apparatus comprising:
   a multiple layer heterostructure having first and second material layers having first and second bandgaps, respectively, and a semiconductor layer having a third bandgap and being positioned between said material layers, the bottom of the conduction band of said semiconductor layer being below the bottom of the conduction bands of said material layers, and the top of the valence bands of said semiconductor layer being above the tops of the valence bands of said material layers, the thickness of said semiconductor layer being sufficient for carrier confinement effects within said semiconductor layer to influence the optical properties of said multiple layer heterostructure, and said multiple layer heterostructure being such that exciton absorption and interband absorption are resolved at room temperature;

means for illuminating said multiple layer heterostructure with light photons having an optical frequency capable of causing absorption transitions between energy levels, said energy levels being influenced by said carrier confinement effects; and means for varying an illumination intensity within said multiple layer heterostructure in order to vary an optical absorption and an index of refraction of said multiple layer heterostructure for said light photons.

2. A nonlinear optical apparatus as in claim 1 further comprising:

a Fabry-Perot cavity and said multiple layer heterostructure is located inside said Fabry-Perot cavity.

3. A nonlinear optical apparatus as in claim 2 wherein said Fabry-Perot cavity is tuned to make a bistable optical device.

4. A nonlinear optical apparatus as in claim 2 wherein said Fabry-Perot cavity is tuned to make an optical amplifier.

5. A nonlinear optical apparatus as in claim 9 wherein said Fabry-Perot cavity is tuned to make a nonlinear optical device.

6. A nonlinear optical apparatus as in claim 2 wherein said Fabry-Perot cavity is made from two mirrors formed by shaping and treating the exterior of said multiple layer heterostructure.

7. A nonlinear optical apparatus as in claim 1 wherein said multiple layer heterostructure is made using GaAs.

8. A nonlinear optical apparatus as in claim 1 wherein said multiple layer heterostructure is made using AlGaAs.

9. A nonlinear optical apparatus as in claim 1 wherein said multiple layer heterostructure is made using InGaAs.

10. A nonlinear optical apparatus as in claim 1 wherein said multiple layer heterostructure is made using InGaAlAs.

11. A nonlinear optical apparatus as in claim 1 wherein said multiple layer heterostructure is made using InGaAsP.

12. A nonlinear optical apparatus as in claim 1 wherein said multiple layer heterostructure is made using HgCdTe.

13. A nonlinear optical apparatus as in claim 1 wherein said multiple layer heterostructure is made using Si.

14. A nonlinear optical apparatus as in claim 1 wherein said multiple layer heterostructure is made using Ge.

15. A nonlinear optical apparatus as in claim 1 wherein said multiple layer heterostructure is made using GaSb.

16. A nonlinear optical apparatus as in claim 1 wherein said multiple layer heterostructure is made using AlGaSb.

17. A nonlinear optical apparatus as in claim 1 wherein said means for illuminating said multiple layer heterostructure comprises an optical waveguide.

18. A nonlinear optical apparatus as in claim 1 wherein said means for varying an illumination intensity comprises an optical waveguide arranged to direct light into said multiple layer heterostructure.

19. A nonlinear optical apparatus as in claim 1 further comprising a substrate
in which both the multiple layer heterostructure and a laser diode are mounted on said substrate.

20. A method for controlling the intensity of an output light beam comprising the steps of:

directing at least one light beam into a multiple layer heterostructure so that it exits as said output light beam;

controlling the optical absorption and index of refraction of said multiple layer heterostructure by controlling the illumination intensity within said multiple layer heterostructure in order to control the intensity of said output light beam;

said multiple layer heterostructure having first and second material layers having first and second bandgaps, respectively, and a semiconductor layer having a third bandgap and being positioned between said material layers, the bottom of the conduction band of said semiconductor layer being below the bottom of the conduction bands of said material layers, and the top of the valence bands of said semiconductor layer being above the tops of the valence bands of said material layers, the thickness of said semiconductor layer being sufficient for carrier confinement effects within said semiconductor layer to influence the optical properties of said multiple layer heterostructure, and said multiple layer heterostructure being such that exciton absorption and interband absorption are resolved at room temperature.

* * * * *